US012620230B2

(12) United States Patent
Ishida et al.

(10) Patent No.: US 12,620,230 B2
(45) Date of Patent: May 5, 2026

(54) NON-TRANSITORY COMPUTER-READABLE RECORDING MEDIUM, INFORMATION PROCESSING METHOD, AND INFORMATION PROCESSING APPARATUS FOR DETECTING FRAUD AT ACCOUNTING MACHINE

(71) Applicant: Fujitsu Limited, Kawasaki (JP)

(72) Inventors: Ryo Ishida, Kawasaki (JP); Daisuke Uchida, Kawasaki (JP); Yasuhiro Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 285 days.

(21) Appl. No.: 18/362,214

(22) Filed: Jul. 31, 2023

(65) Prior Publication Data

US 2024/0193993 A1    Jun. 13, 2024

(30) Foreign Application Priority Data

Dec. 7, 2022    (JP) ................................. 2022-195932

(51) Int. Cl.
*G06V 20/52* (2022.01)
*G06Q 20/18* (2012.01)
(Continued)

(52) U.S. Cl.
CPC ............. *G06V 20/52* (2022.01); *G06Q 20/18* (2013.01); *G06V 10/70* (2022.01); *G06V 20/41* (2022.01); *G06V 40/28* (2022.01)

(58) Field of Classification Search
CPC ........ G06V 40/28; G06V 10/70; G06V 20/41; G06V 20/52; G08B 13/19613; G07G 3/003; G06Q 20/18; G06Q 20/206
See application file for complete search history.

(56) References Cited

U.S. PATENT DOCUMENTS 5,965,861 A    10/1999    Addy et al.
6,236,736 B1    5/2001    Crabtree et al.
(Continued)

FOREIGN PATENT DOCUMENTS

CN    11055356 A    *    12/2019
CN    115244560    10/2022
(Continued)

OTHER PUBLICATIONS

EESR—Extended European Search Report mailed on Nov. 14, 2023 for European Patent Application No. 23190821.1 (6 pages).
(Continued)

*Primary Examiner* — John Villecco
(74) *Attorney, Agent, or Firm* — Fujitsu Intellectual Property Center

(57) ABSTRACT

An information processing apparatus acquires video image data on a person who is scanning a code of a commodity product to an accounting machine, and specifies, from the acquired video image data by analyzing the acquired video image data, a region of a hand of the person and a region of the commodity product that is being gripped in the hand of the person. The information processing apparatus tracks either a movement of the hand of the person that is gripping the commodity product, or, a movement of the gripped commodity product, and generates, based on a change in the tracked movement of the hand or a change in the tracked movement of the commodity product, an alert connected to an abnormality of a behavior of registering the commodity product to the accounting machine.

12 Claims, 16 Drawing Sheets

(51) Int. Cl.
  *G06V 10/70* (2022.01)
  *G06V 20/40* (2022.01)
  *G06V 40/20* (2022.01)

(56) References Cited

U.S. PATENT DOCUMENTS

| | | | |
|---|---|---|---|
| 11,244,548 B2 * | 2/2022 | Wen | G06N 3/08 |
| 11,501,614 B2 * | 11/2022 | Wen | G07G 3/006 |
| 11,704,650 B2 * | 7/2023 | Costello | G06Q 20/206 |
| | | | 705/18 |
| 12,266,183 B2 * | 4/2025 | Ushijima | G06Q 20/208 |
| 2016/0078300 A1 | 3/2016 | Kundu et al. | |
| 2020/0234056 A1 * | 7/2020 | Pricochi | G06Q 30/0609 |
| 2021/0117949 A1 * | 4/2021 | Guo | G06T 7/70 |
| 2021/0216785 A1 * | 7/2021 | Debucean | G06F 18/2415 |
| 2021/0217017 A1 * | 7/2021 | Scott | G06V 20/52 |
| 2021/0272086 A1 | 9/2021 | Buibas et al. | |
| 2021/0280027 A1 | 9/2021 | Wen et al. | |
| 2022/0189265 A1 * | 6/2022 | Yamazaki | G07G 1/0054 |
| 2022/0222644 A1 * | 7/2022 | Okamura | G06Q 20/4016 |
| 2023/0100920 A1 * | 3/2023 | Ushijima | G07G 1/12 |
| | | | 348/143 |
| 2023/0101001 A1 * | 3/2023 | Ushijima | G06V 10/25 |
| | | | 382/103 |
| 2023/0120798 A1 * | 4/2023 | Palande | G06V 10/25 |
| | | | 705/23 |
| 2023/0130735 A1 * | 4/2023 | Perrucci | G06V 20/53 |
| | | | 382/103 |
| 2023/0259944 A1 * | 8/2023 | Gotanda | G07G 1/0018 |
| | | | 705/23 |
| 2024/0029441 A1 * | 1/2024 | Jeon | G06V 20/52 |
| 2024/0096182 A1 * | 3/2024 | Kawai | G07G 1/0063 |
| 2024/0169735 A1 * | 5/2024 | Gabale | G06V 10/764 |
| 2024/0211952 A1 * | 6/2024 | Obinata | G06V 10/70 |

FOREIGN PATENT DOCUMENTS

| | | | | |
|---|---|---|---|---|
| EP | 4383167 A1 * | 6/2024 | | G06V 10/422 |
| JP | 2020-053019 | 4/2020 | | |
| JP | 2022187215 A * | 12/2022 | | |
| KR | 20220086277 * | 6/2022 | | |

OTHER PUBLICATIONS

KROA—Office Action mailed on Mar. 12, 2025 for corresponding Korean Application No. 10-2023-0116043 with English translation (9 pages). U.S. Pat. No. 6,236,736 cited in the KROA was previously submitted in the IDS filed on Dec. 5, 2023.

EPOA—Office Action for European Patent Application No. 23190821.1, mailed Jan. 16, 2026 (8 pages). **All references cited in the EPOA were previously submitted in the IDS filed on Dec. 5, 2023.

* cited by examiner

CORRECT ANSWER
INFORMATION

PERSON (CLASS, B BOX)

RELATIONSHIP (GRIP CLASS)

RELATIONSHIP (GRIP CLASS)

CHECKOUT BAG
(CLASS, B BOX)

SOMETHING
(CLASS, B BOX)

INPUT DATA

"hoi_annotation": [{"subject_id": 0, "object_id": 1, "action_id": 37},
{"subject_id": 2, "object_id": 3, "action_id": 115}], "annotations":
[{"bbox": [2, 2, 639, 475], "category_id": 1},
{"bbox": [392, 128, 633, 340], "category_id": 3},
{"bbox": [1, 1, 637, 478], "category_id": 1},
{"bbox": [394, 134, 632, 342], "category_id": 3}]}

FIG.5

| FRAUD CATEGORY | TARGET | FRAUD PATTERN |
|---|---|---|
| FRAUD 1 | MOVEMENT OF COMMODITY PRODUCT | GRIP TWO COMMODITY PRODUCTS → PILE UP COMMODITY PRODUCTS → PUT TWO COMMODITY PRODUCTS INTO BAG |
| FRAUD 2 | MOVEMENT OF COMMODITY PRODUCT | SCAN PLURALITY OF SMALL COMMODITY PRODUCTS → TAKE OUT ANOTHER COMMODITY PRODUCT FROM BASKET AND PUT IT INTO BAG |
| FRAUD 3 | MOVEMENT OF HAND | HOLD COMMODITY PRODUCTS IN BOTH HANDS |
| FRAUD 4 | MOVEMENT OF HAND | GRIP COMMODITY PRODUCTS IN EACH OF RIGHT HAND AND LEFT HAND → SCAN ONLY ONE OF COMMODITY PRODUCTS → PUT BOTH COMMODITY PRODUCTS INTO BAG |
| FRAUD 5 | MOVEMENT OF HAND AND MOVEMENT OF COMMODITY PRODUCT | GRIP PLURALITY OF COMMODITY PRODUCTS → REGISTER ONE COMMODITY PRODUCT AT REGISTER SCREEN → PUT PLURALITY OF COMMODITY PRODUCTS INTO BAG |
| ... | ... | ... |

Figure 9:
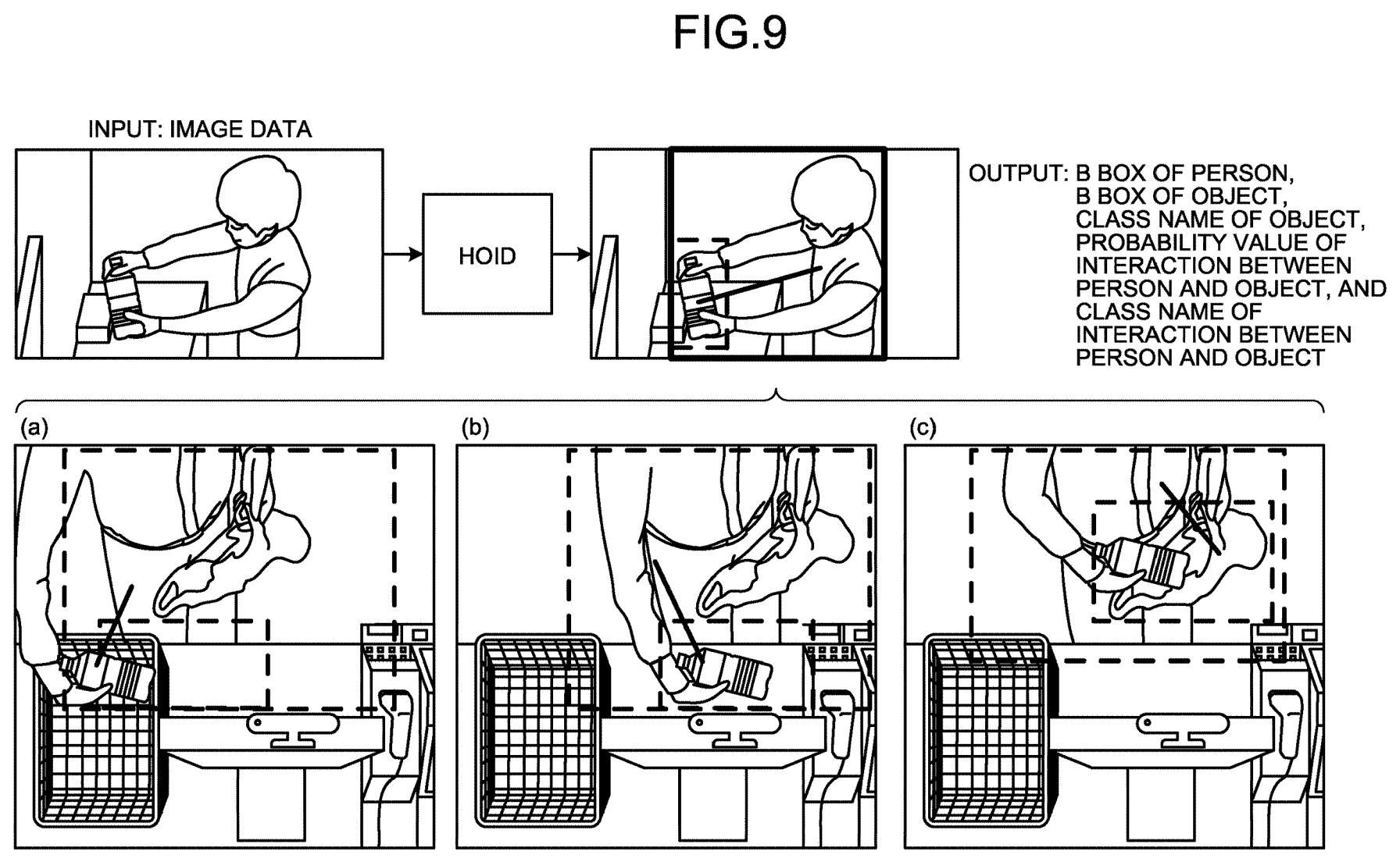

INPUT: IMAGE DATA

HOID

OUTPUT: B BOX OF PERSON, B BOX OF OBJECT, CLASS NAME OF OBJECT, PROBABILITY VALUE OF INTERACTION BETWEEN PERSON AND OBJECT, AND CLASS NAME OF INTERACTION BETWEEN PERSON AND OBJECT (a)

(b)

(c)

50

50

NON-TRANSITORY COMPUTER-READABLE RECORDING MEDIUM, INFORMATION PROCESSING METHOD, AND INFORMATION PROCESSING APPARATUS FOR DETECTING FRAUD AT ACCOUNTING MACHINE

CROSS-REFERENCE TO RELATED APPLICATION

This application is based upon and claims the benefit of priority of the prior Japanese Patent Application No. 2022-195932, filed on Dec. 7, 2022, the entire contents of which are incorporated herein by reference.

FIELD

The embodiments discussed herein are related to an information processing program, an information processing method, and an information processing apparatus.

BACKGROUND

In stores, such as supermarkets and convenience stores, self-service checkout registers are becoming widely used. A self-service checkout register is a point of sale (POS) checkout register system in which a user who purchases commodity products perform a series of processes between a process of reading bar code assigned to each of the commodity products and a process of calculating a payment amount. For example, by installing the self-service checkout register, it is possible to improve a labor shortage caused by a decrease in population and suppress labor costs.

Patent Document 1: Japanese Laid-open Patent Publication No. 2020-53019

SUMMARY

According to an aspect of an embodiment, a non-transitory computer-readable recording medium stores therein an information processing program that causes a computer to execute a process. The process includes acquiring video image data on a person who is scanning a code of a commodity product to an accounting machine, specifying, from the acquired video image data by analyzing the acquired video image data, a region of a hand of the person and a region of the commodity product that is being gripped in the hand of the person, tracking either a movement of the hand of the person that is gripping the commodity product, or, a movement of the gripped commodity product, and generating, based on a change in the tracked movement of the hand or a change in the tracked movement of the commodity product, an alert connected to an abnormality of a behavior of registering the commodity product to the accounting machine.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

However, in the technology described above, it is difficult to detect a fraud. For example, at an accounting machine, such as a self-service checkout register, an inevitable error, an intentional fraud, or the like is made by a user, thus resulting in incurring an unpaid amount or the like.

An example of the inevitable error includes a scan omission of a commodity product as a result of a user forgetting to scan the commodity product and moving the commodity product from a basket to a checkout bag, and the like. In addition, examples of the intentional fraud include a bar code hiding occurring when a user pretends to scan a commodity product by hiding only a bar code by the user's fingers, a read error occurring when a user erroneously reads a bar code assigned to a can instead of a bar code assigned to a beer case as a result of different bar codes being assigned to each of the beer case containing, for example, a set of six cans and the individual cans, and the like.

In addition, it is conceivable to detect a fraud by automatically counting the number of commodity products by installing a weight sensor in each of the self-service checkout registers; however, a cost is excessively high, and this method is unrealistic for, in particular, large-scale stores and stores having operations across the country.

In addition, at the self-service checkout register, there is another aspect in which it is difficult to detect a fraudulent act because a scan of a commodity product code or calculation of a payment amount is entrusted by a user himself or herself. For example, even if image recognition Artificial Intelligence (AI) is used in an aspect of detecting the fraudulent act described above, a huge amount of training data is needed for training of the image recognition AI. However, in stores, such as supermarkets and convenience stores, many types of commodity products are present, and, in addition, a life cycle of each of the commodity products is short, so that a replacement of each of commodity products frequently occurs. It is difficult to tune the image recognition AI in accordance with the life cycle of these types of commodity products, or it is difficult to perform training of new image recognition AI.

Figure 1:
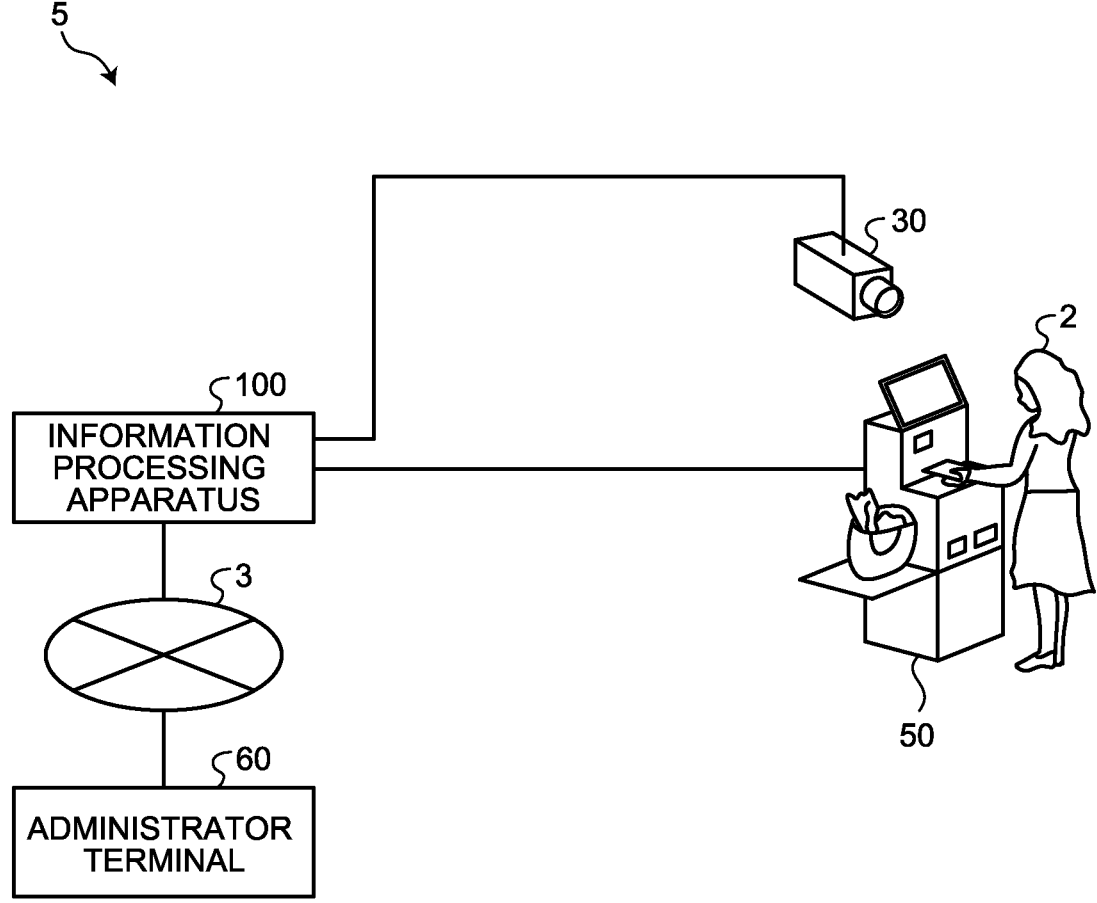
Figure 2:
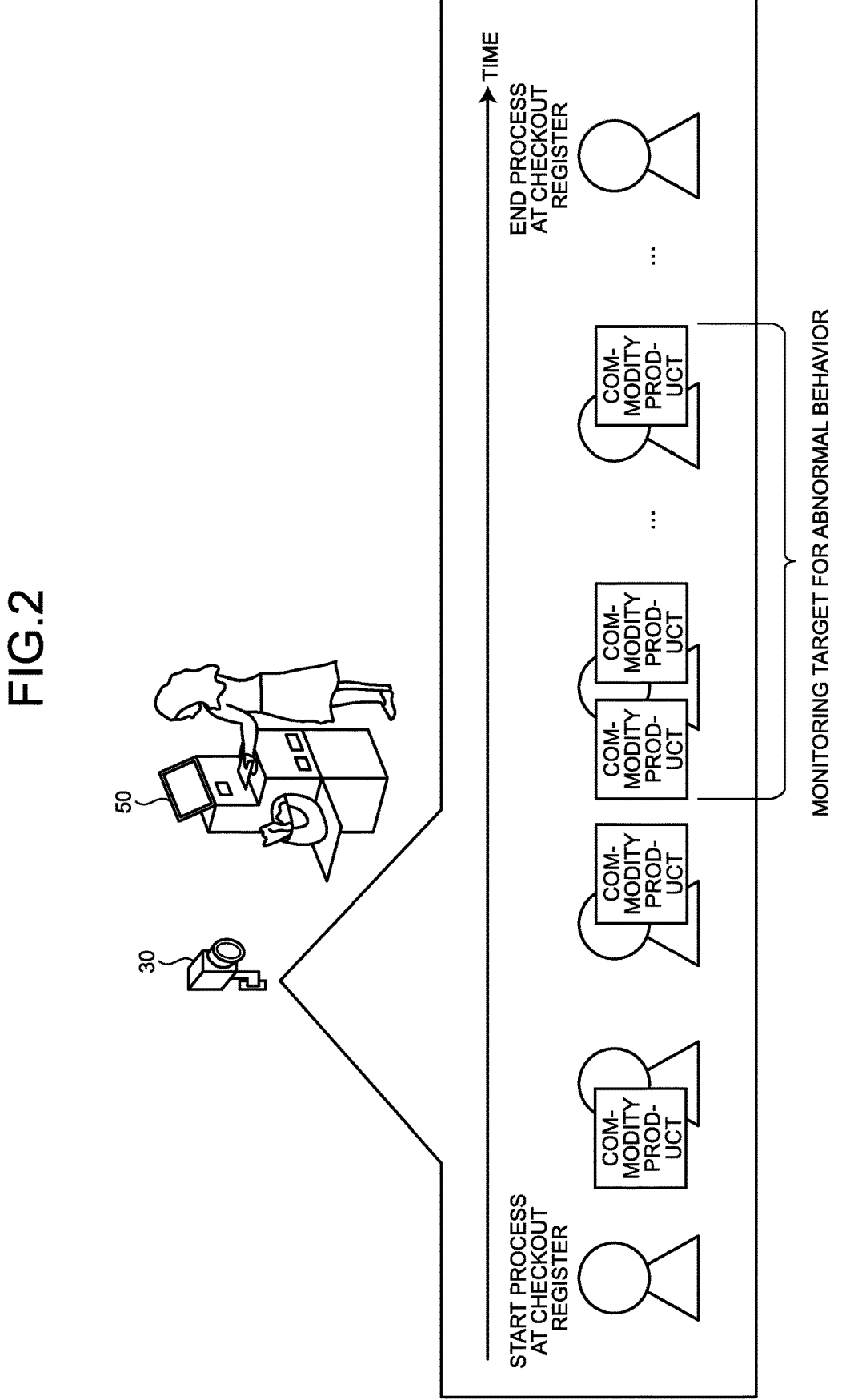
Figure 3:
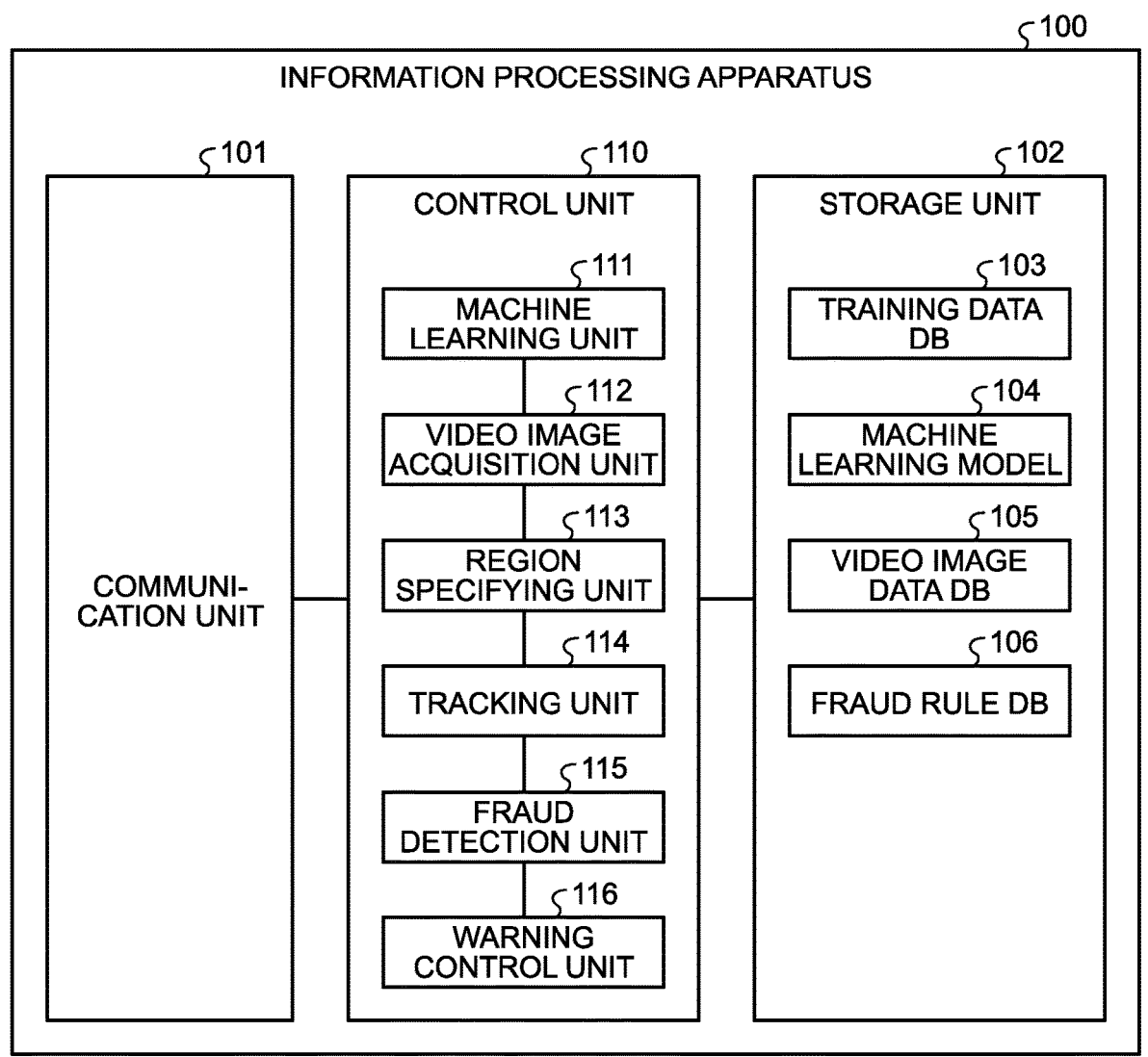
Figure 4:
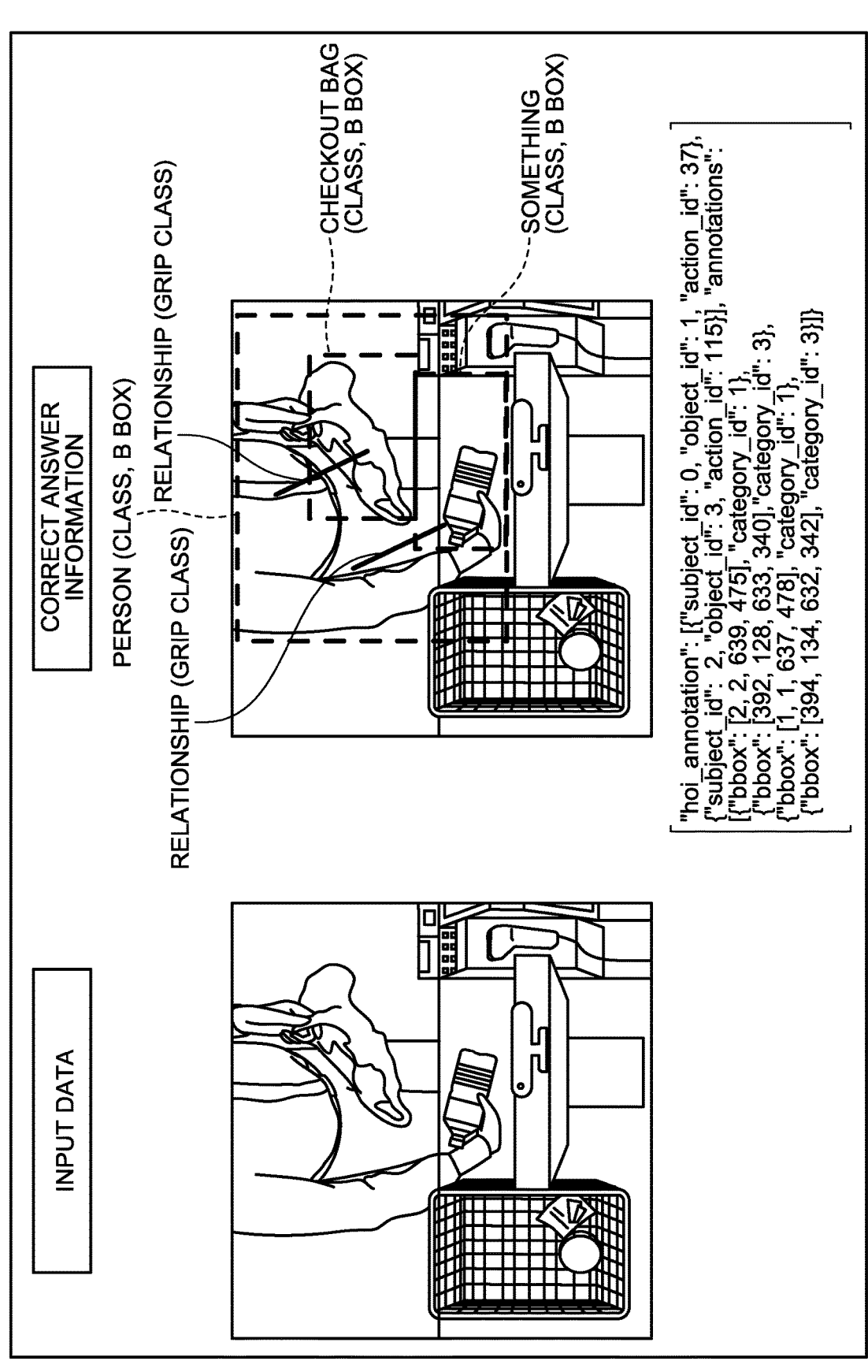
Figure 7:
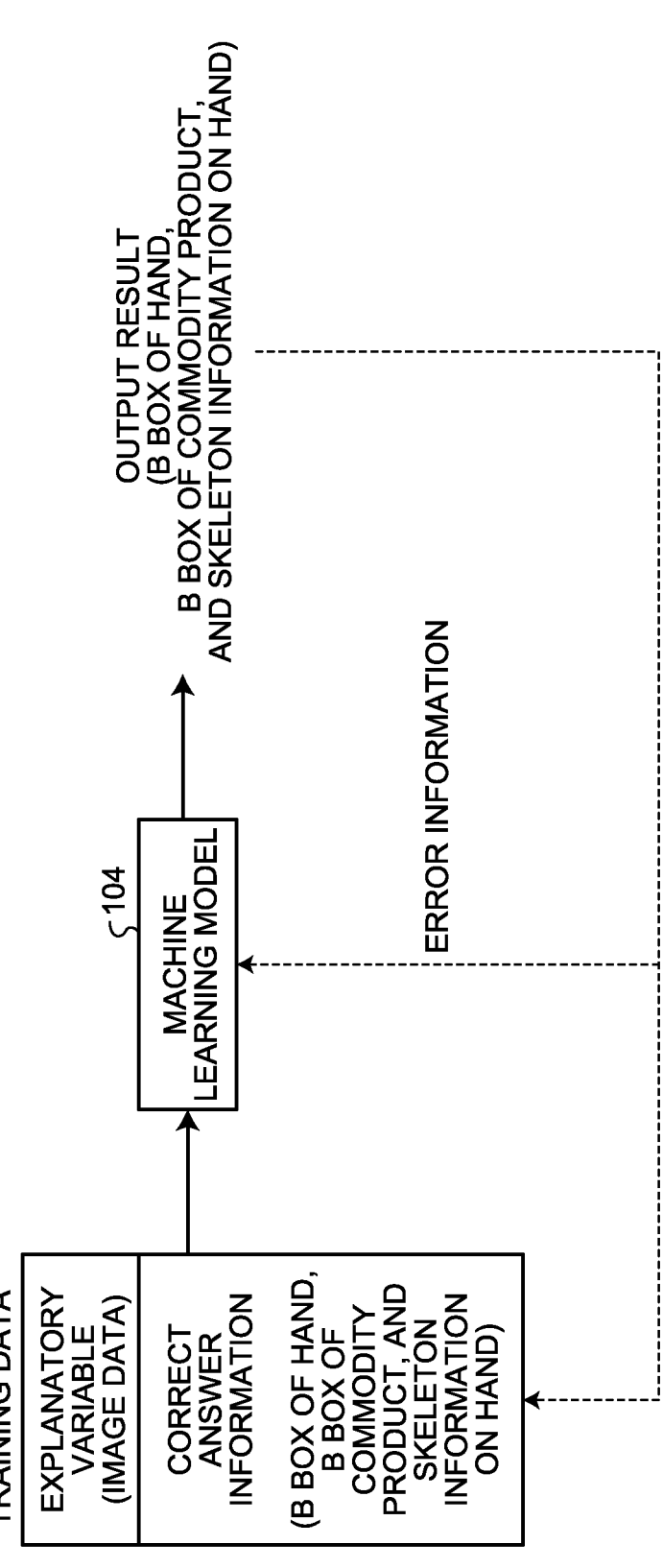
Figure 8:
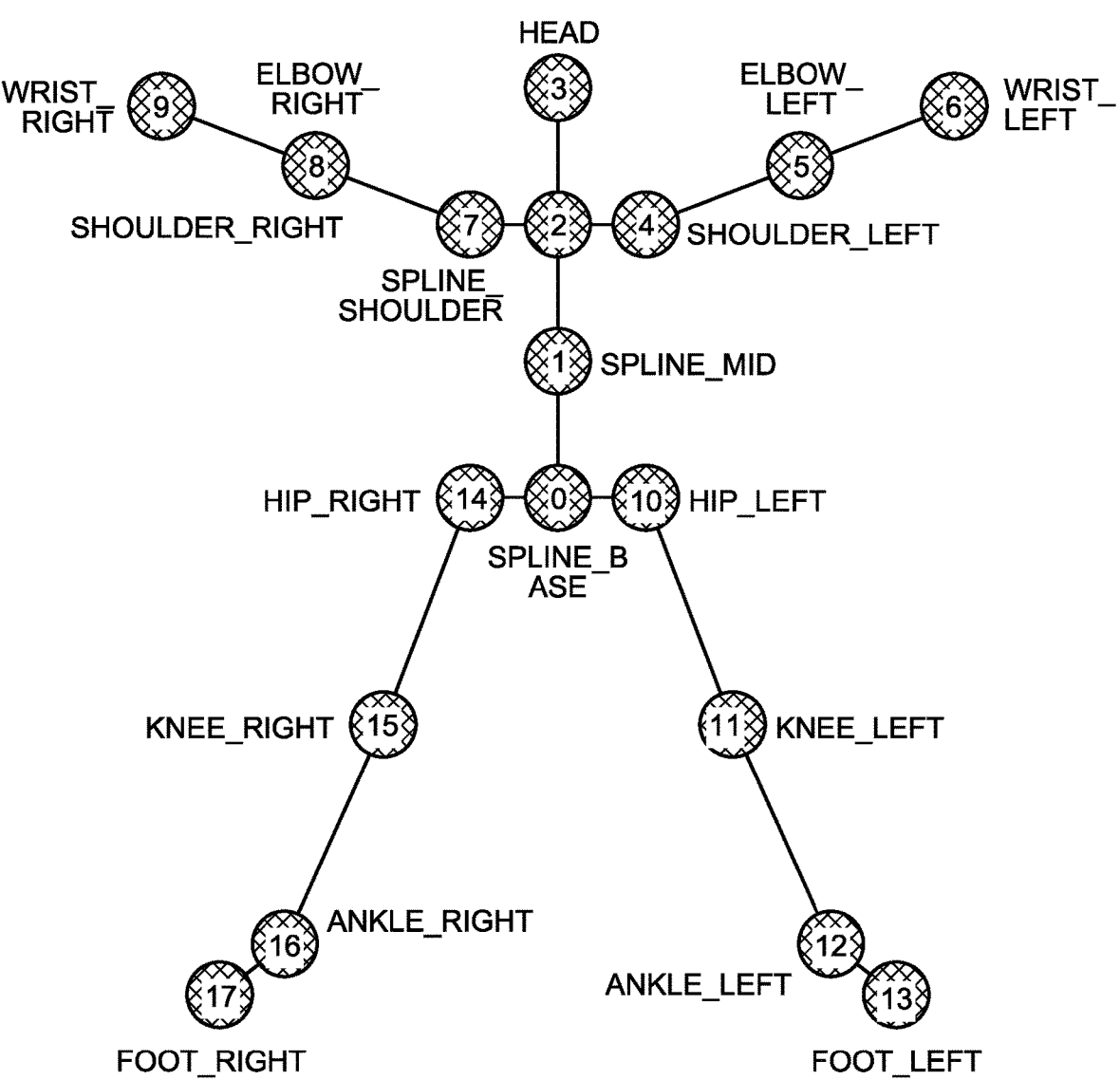
Figure 10:
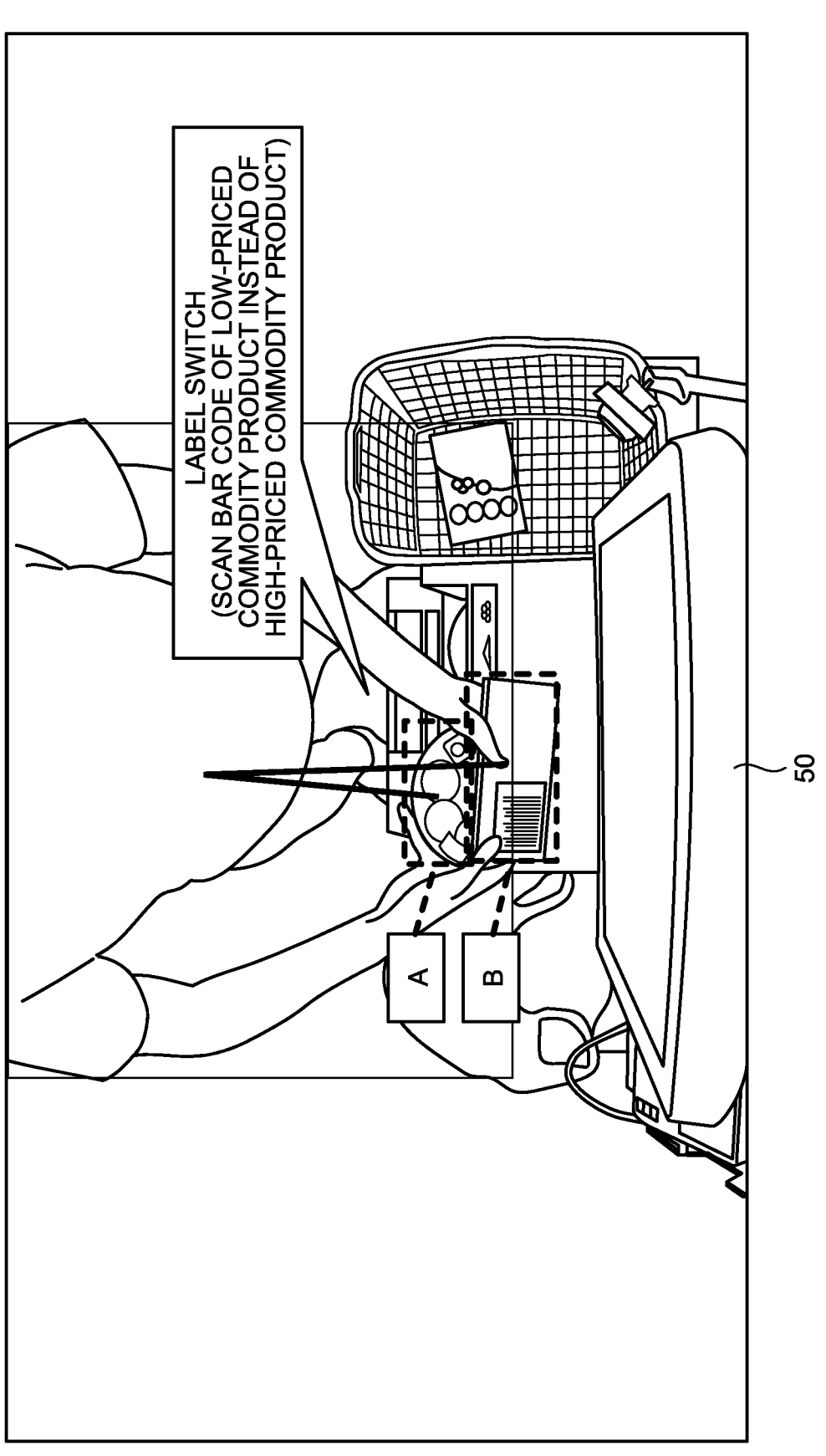
Figure 11:
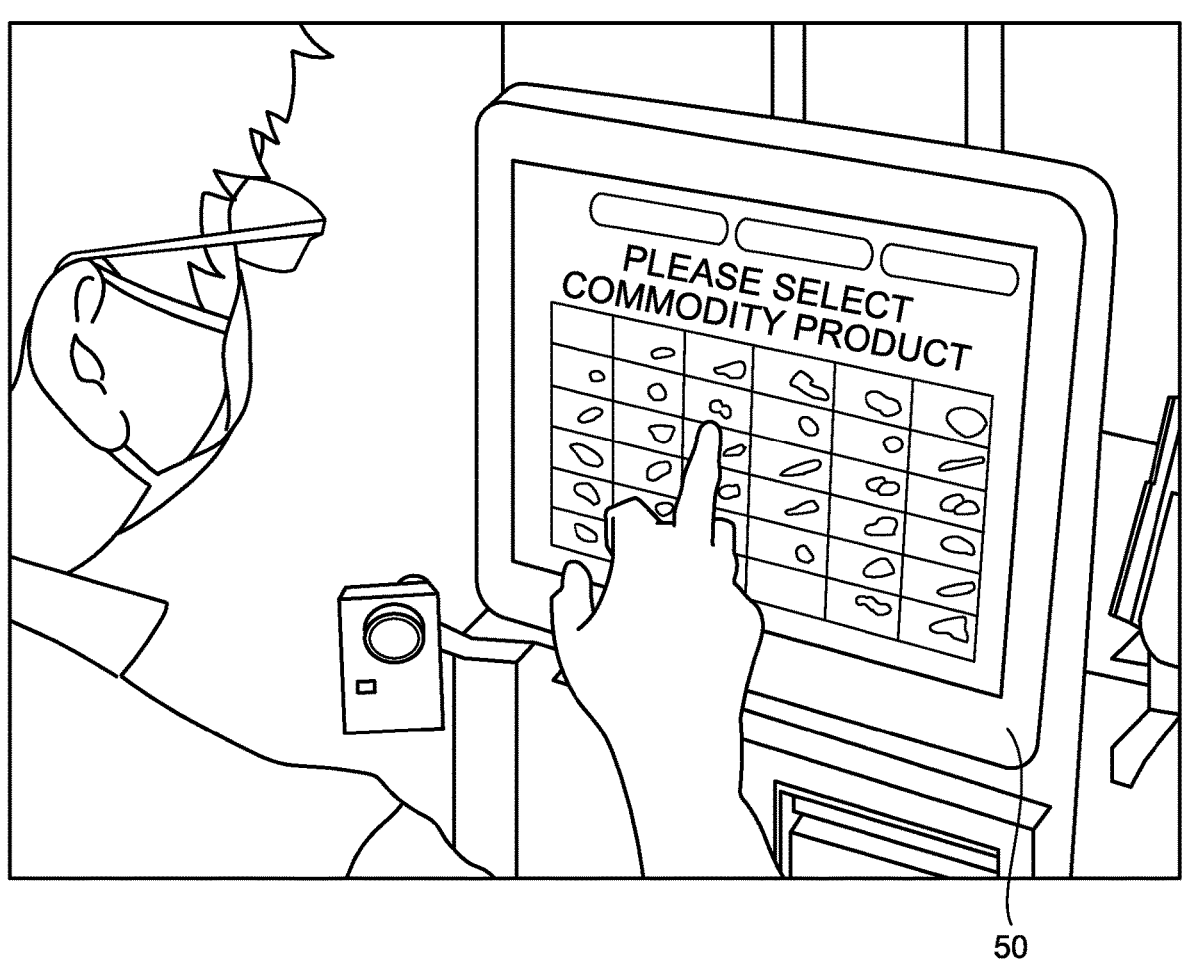
Figure 12:
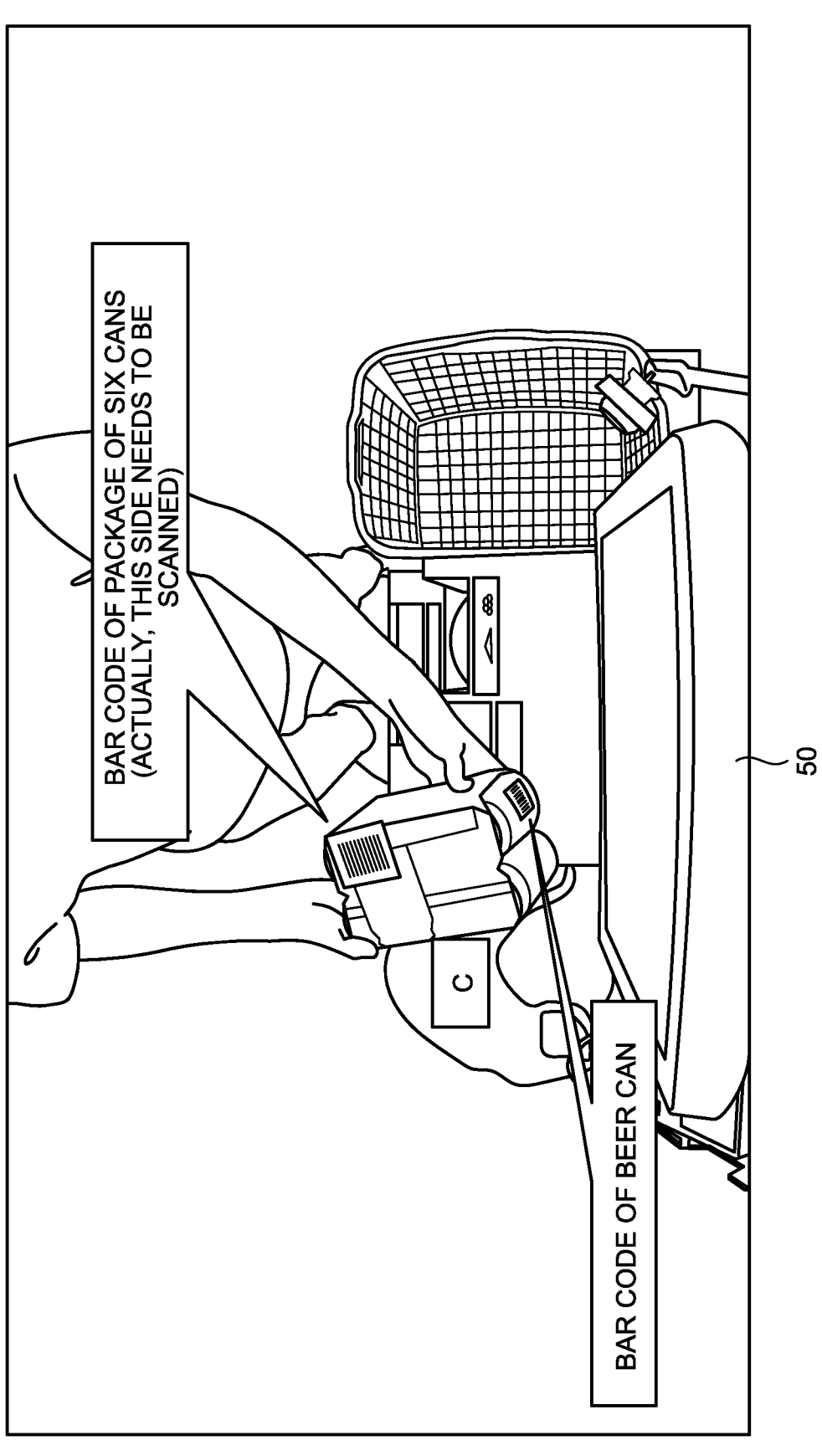
Figure 13:
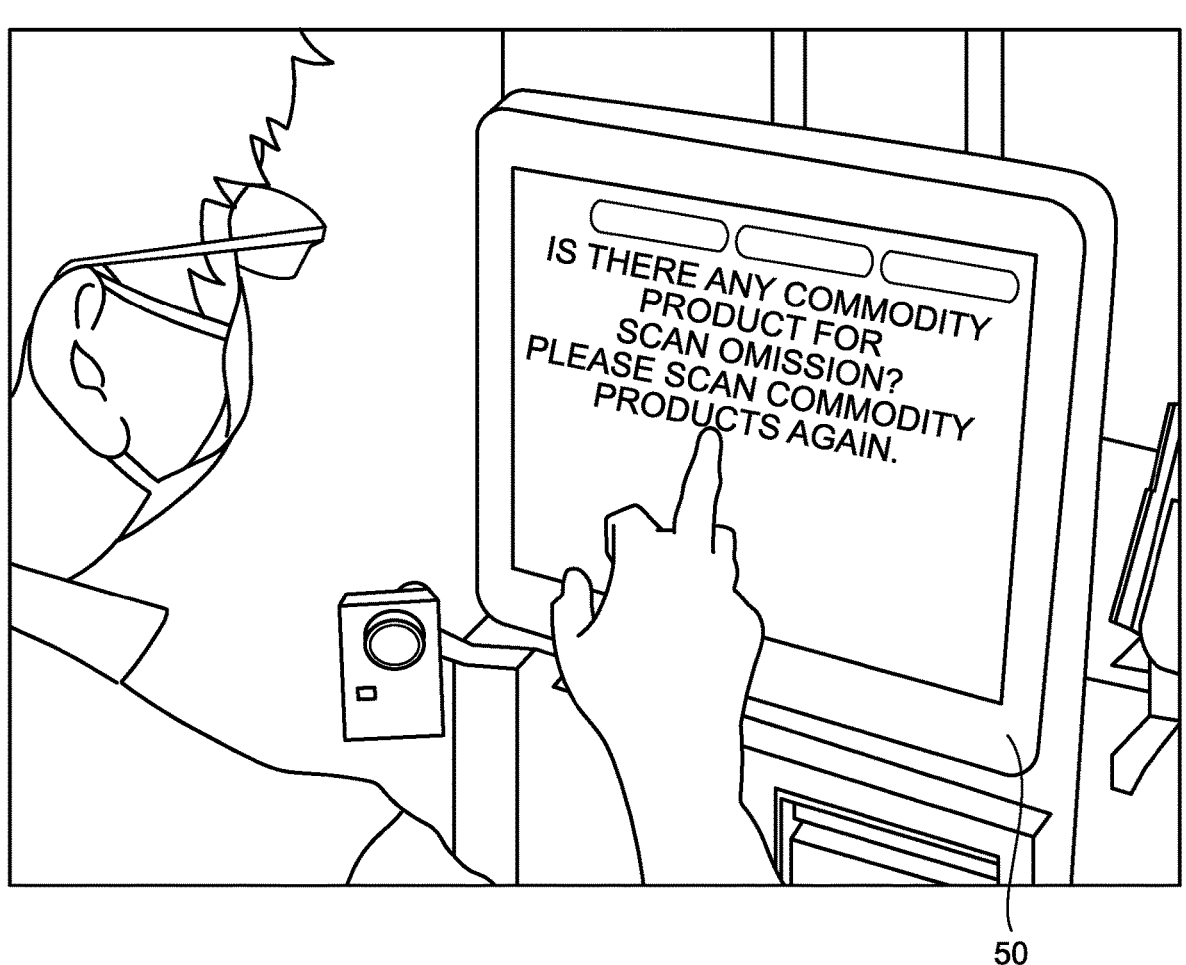
Figure 14:
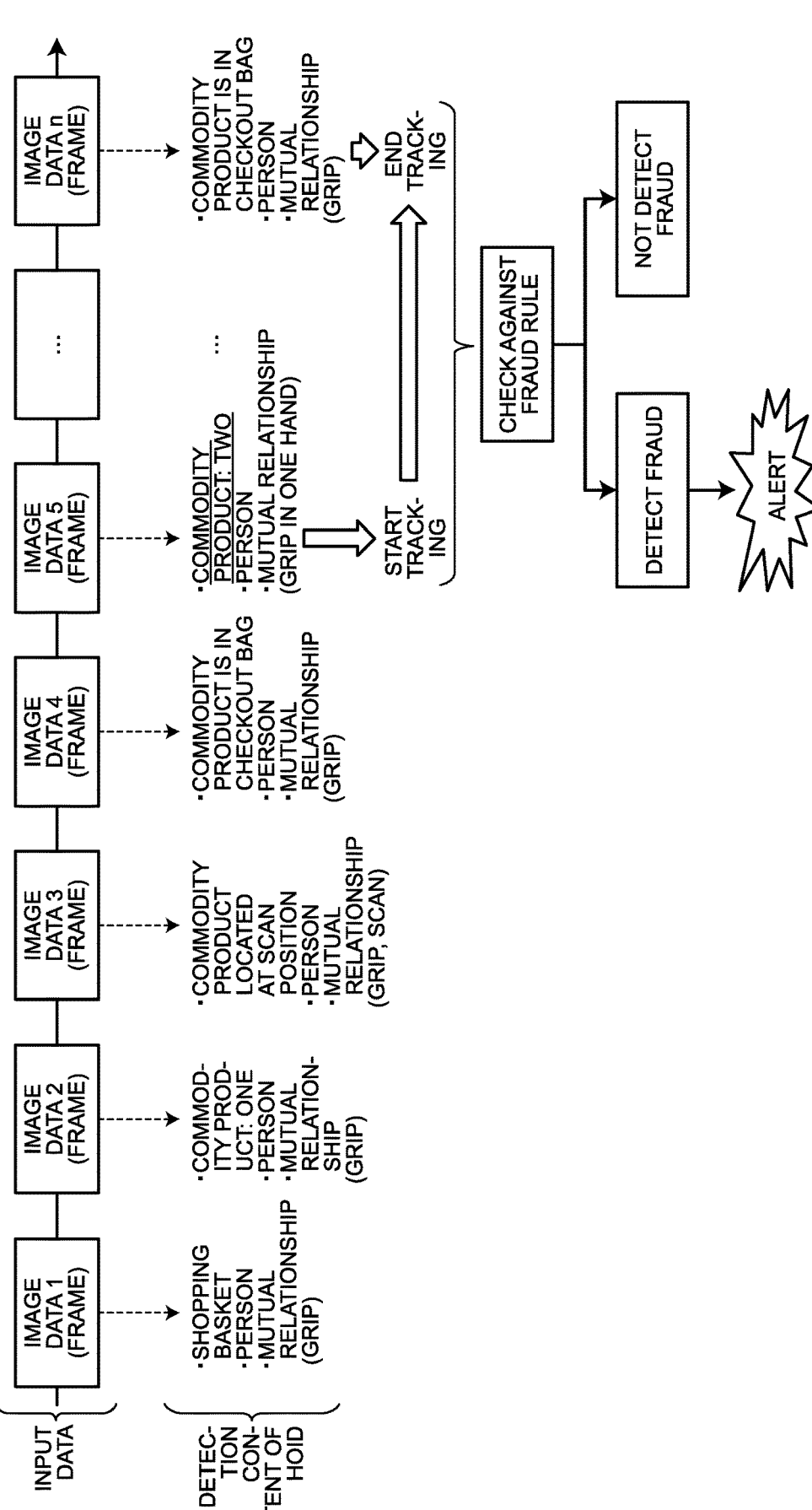
Figure 15:
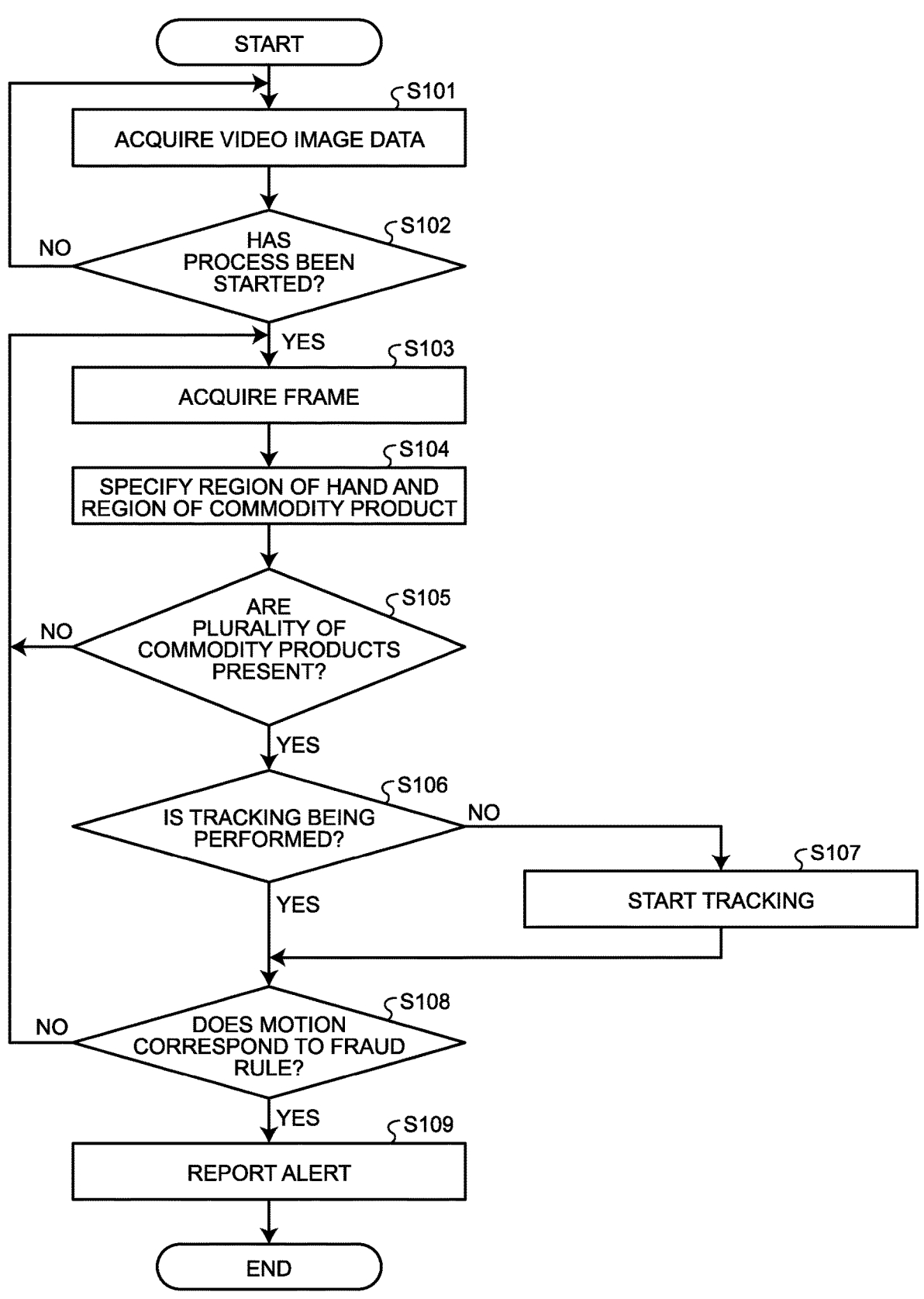
Figure 16:
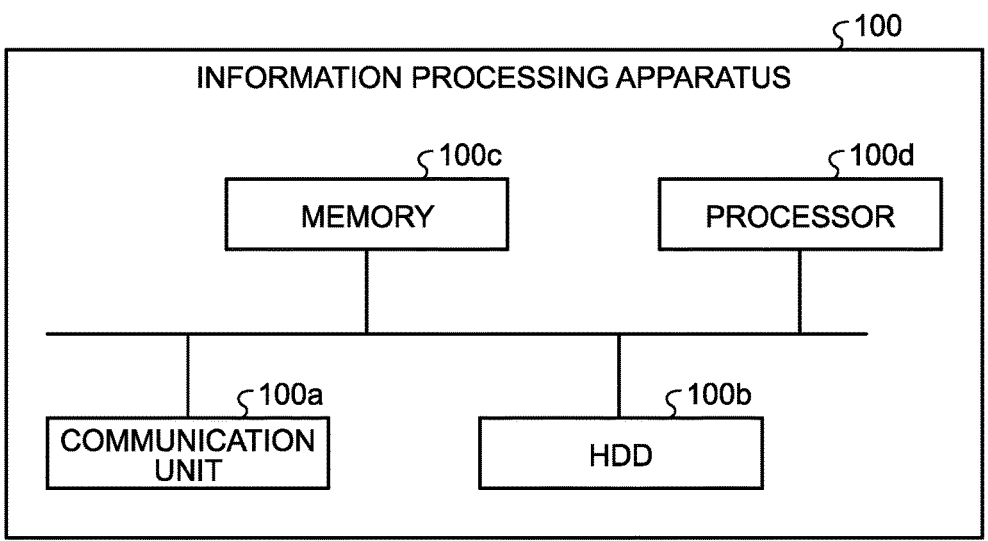
Figure 17:
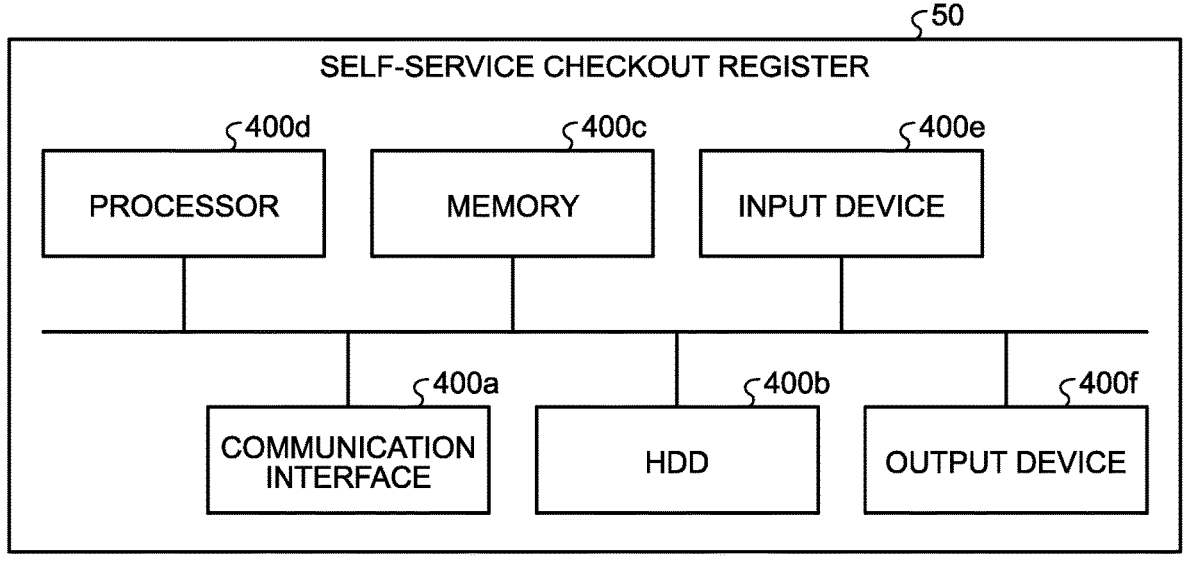

FIG. 1 is a diagram illustrating an example of the overall configuration of a self-service checkout register system according to a first embodiment;

FIG. 2 is a diagram illustrating a detection example of an abnormal behavior according to the first embodiment;

FIG. 3 is a functional block diagram illustrating a functional configuration of an information processing apparatus according to the first embodiment;

FIG. 4 is a diagram illustrating training data;

FIG. 5 is a diagram illustrating an example of information stored in a fraud rule DB;

Figure 6:
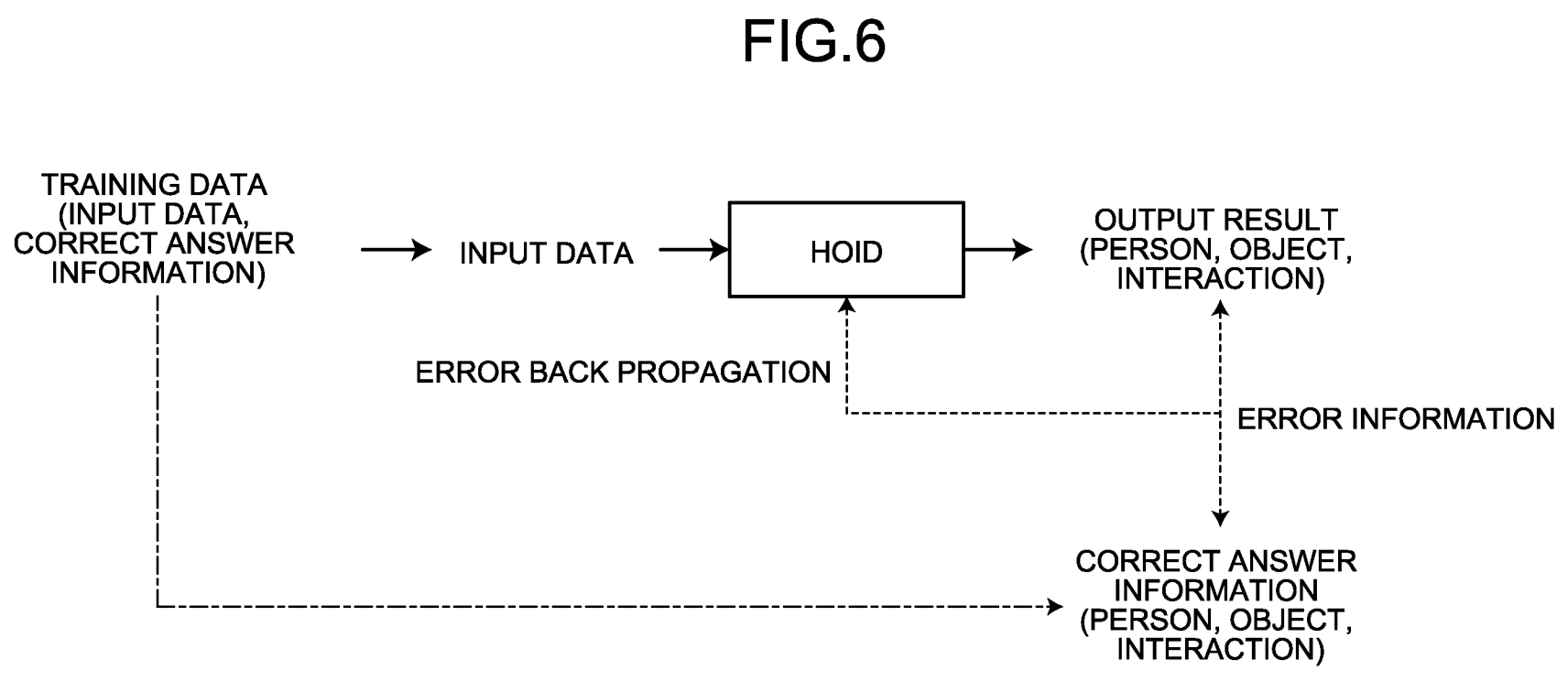

FIG. 6 is a diagram (1) illustrating machine learning performed on a machine learning model;

FIG. 7 is a diagram (2) illustrating machine learning performed on a machine learning model;

FIG. 8 is a diagram illustrating an example of skeleton information;

FIG. 9 is a diagram illustrating behavioral identification obtained by using HOID;

FIG. 10 is a diagram illustrating an example of fraud detection in the case where two commodity products are gripped;

FIG. 11 is a diagram illustrating fraud detection performed based on a fraudulent behavior that is defined in advance;

FIG. 12 is a diagram illustrating an example of fraud detection performed on the basis of a positional relationship;

FIG. 13 is a diagram illustrating a report example of an alert;

FIG. 14 is a diagram illustrating a series of the flow of tracking, fraud detection, and up to an alert report;

FIG. 15 is a flowchart illustrating the flow of a process;

FIG. 16 is a diagram illustrating an example of a hardware configuration; and FIG. 17 is a diagram illustrating an example of a hardware configuration of the self-service checkout register.

DESCRIPTION OF EMBODIMENTS

Preferred embodiments will be explained with reference to accompanying drawings. Furthermore, the present embodiment is not limited by the embodiments. In addition, each of the embodiments can be used in any appropriate combination as long as they do not conflict with each other.

(a) First Embodiment

Explanation of self-service checkout register system FIG. 1 is a diagram illustrating an example of the overall configuration of a self-service checkout register system 5 according to a first embodiment. As illustrated in FIG. 1, the self-service checkout register system 5 includes a camera 30, a self-service checkout register 50, an administrator terminal 60, and an information processing apparatus 100.

The information processing apparatus 100 is one example of a computer that is connected to the camera 30 and the self-service checkout register 50. The information processing apparatus 100 is connected to the administrator terminal 60 via a network 3 that is applicable to various communication networks irrespective of a wired or wireless manner. The camera 30 and the self-service checkout register 50 may be connected to the information processing apparatus 100 via the network 3.

The camera 30 is one example of a camera that captures a video image of a region including the self-service checkout register 50. The camera 30 transmits data on the video image to the information processing apparatus 100. In a description below, the data on the video image is sometimes referred to as "video image data" or is sometimes simply referred to as a "video image". In the video image data, a plurality of image frames obtained in time series are included. A frame number is assigned to each of the image frames in an ascending order in time series. A single image frame is image data of a still image that is captured by the camera 30 at a certain timing. In a description below, the image data is sometimes simply referred to as an "image".

The self-service checkout register 50 is one example of a POS checkout register system or an accounting machine in which a user 2 who purchases a commodity product performs a series of processes between a process of reading a bar code assigned to the commodity product and a process of calculating a payment amount. For example, if the user 2 moves a commodity product targeted for a purchase to a scan region included in the self-service checkout register 50, the self-service checkout register 50 scans the bar code assigned to the commodity product, and registers the commodity product as the commodity product targeted for the purchase.

In addition, as described above, the self-service checkout register 50 is one example of a self-service checkout register in which a customer registers the commodity products to be purchased (checkout register work) and makes a payment by himself or herself, and is called, for example, self-checkout, automated checkout, self-checkout machine, self-check-out register, or the like.

The bar code is a kind of an identifier representing a numerical value or a letter according to the width of each of the lines constituting a striped pattern shape, and it is possible to specify an amount of money, a category (for example, foods), or the like of a commodity product by scanning (reading) the bar code by the self-service checkout register 50. The bar code is one example of a code, and, in addition to the bar code, it is possible to use a two-dimensional code, such as a quick response (QR) code, having the same function.

The user 2 repeatedly performs a motion of registering the commodity product described above, and, when a scan of the commodity products has been completed, the user 2 operates a touch panel of the self-service checkout register 50, and makes a request for calculation of a payment amount. When the self-service checkout register 50 receives the request for calculation of the payment amount, the self-service checkout register 50 presents the number of commodity products targeted for the purchase, an amount of money for the purchase, and the like, and then, performs a process of calculation of the payment amount. The self-service checkout register 50 stores, as self-service checkout register data (commodity product information) in a storage unit, information on the commodity products scanned in a period of time between a point at which the user 2 starts the scan and a point at which the user 2 makes the request for calculation of the payment amount, and then, transmits the information to the information processing apparatus 100.

The administrator terminal 60 is one example of a terminal device that is used by an administrator of the store. The administrator terminal 60 receives, from the information processing apparatus 100, a notification of an alert or the like indicating that a fraud related to a purchase of a commodity product has been conducted.

With this configuration, the information processing apparatus 100 acquires video image data on a person who is scanning a bar code of a commodity product to the self-service checkout register 50, and specifies, from the acquired video image data by inputting the video image data to the machine learning model, a region of a hand of the person and a region of the commodity product that is being gripped in the hand of the person. In addition, it is also possible to specify each of the regions from the video image data by using image analysis or the like instead of using the machine learning model. Then, if the number of commodity products that are being gripped in the hand of the person is plural, the information processing apparatus 100 tracks either a movement of the hand of the person that is gripping a plurality of commodity products, or, a movement of the plurality of commodity products. After that, the information processing apparatus 100 generates, on the basis of a change in the tracked movement of the hand or a change in the movement of the plurality of commodity products, an alert connected to an abnormality of a behavior of registering the commodity products to the self-service checkout register 50.

FIG. 2 is a diagram illustrating a detection example of an abnormal behavior according to the first embodiment. As illustrated in FIG. 2, when a person is detected in the video image data that has been captured by the camera 30 that captures the surrounding area of the self-service checkout register 50, the information processing apparatus 100 detects a start of a process performed at a checkout register. After that, the information processing apparatus 100 specifies the region of the hand of the person and the region of the commodity product from the video image data that is captured at any time. Then, in the case where a plurality of commodity products have been detected from the video image, the information processing apparatus 100 starts a tracking process and tracks until the number of commodity products is one. Here, the information processing apparatus 100 detects an abnormal behavior, such as a read error or bar code hiding, on the basis of a movement of the hand of the person who is being tracked and a movement of the commodity product that is being tracked.

In other words, in general, a user selects commodity products that are targeted for a purchase, puts the commodity products that have been selected inside of a store into a carrying tool, such as a shopping basket or a commodity product cart, that is used to put in and carry the selected commodity products to the self-service checkout register, takes out the selected commodity products one by one from the cart, and then, scans each of the commodity products to the self-service checkout register 50. Accordingly, in the case where the information processing apparatus 100 detects a motion of holding a plurality of commodity products in a scan region, the information processing apparatus 100 pays attention to the motions subsequent to the detected motion considering that the detected motion is likely to lead to an abnormal behavior. However, there may be a user who holds a plurality of commodity products, a motion of holding the plurality of commodity products is not always directly linked to an abnormal behavior. Thus, the information processing apparatus 100 implements immediate detection of an abnormal behavior according to whether or not a change in a movement of a hand of a person who is being tracked or a change in a movement of a commodity product that is being tracked match a fraudulent pattern that has been assigned in advance.

Functional Configuration

FIG. 3 is a functional block diagram illustrating a functional configuration of the information processing apparatus 100 according to the first embodiment. As illustrated in FIG. 3, the information processing apparatus 100 includes a communication unit 101, a storage unit 102, and a control unit 110.

The communication unit 101 is a processing unit that controls communication with another device and is implemented by, for example, a communication interface or the like. For example, the communication unit 101 receives video image data from the camera 30, and outputs a processing result obtained by the control unit 110 to the administrator terminal 60.

The storage unit 102 is a processing unit that stores therein various kinds of data, a program executed by the control unit 110, or the like, and is implemented by, for example, a memory, a hard disk, or the like. The storage unit 102 stores therein a training data DB 103, a machine learning model 104, a video image data DB 105, and a fraud rule DB 106.

The training data DB 103 is a database that stores therein data that is used for a training of the machine learning model 104. For example, a case will be described by using an example illustrated in FIG. 4 in which a model that is used for Human Object Interaction Detection (HOID) is used for the machine learning model 104. FIG. 4 is a diagram illustrating training data. As illustrated in FIG. 4, each of the pieces of training data includes image data that is used as input data, and correct answer information (label) that has been set to the associated image data.

In the correct answer information, a class of a person and an object that are the detection target, a class that indicates an interaction between a person and an object, and a bounding box (Bbox indicating region information on an object) that indicates a region of each of the classes are set.

For example, as the correct answer information, region information on a Something class that indicates an object that is a commodity product or the like and that is other than a checkout bag, region information on a class of a person that indicates a user who purchases a commodity product, and a relationship (grip class) that indicates an interaction between the Something class and the class of the person are set. In other words, as the correct answer information, information on an object that is being gripped by a person is set. In addition, the class of the person is one example of a first class, the Something class is one example of a second class, the region information on the class of the person is one example of a first region, the region information on the class of Something is one example of a second region, and the interaction between the person and the object is one example of the interaction.

In addition, as the correct answer information, region information on a class of a checkout bag that indicates a checkout bag, region information of a class of a person that indicates a user who uses the checkout bag, and a relationship (grip class) that indicates an interaction between the class of the checkout bag and the class of the person are set. In other words, as the correct answer information, information on the checkout bag that is being gripped by the person is set.

In general, if a Something class is generated by using a normal object identification (object recognition), all of the backgrounds, clothes, small goods, and the like that are not related to a task are consequently detected. In addition, all of these items correspond to Something, so that a lot of Bboxes are just identified in the image data and nothing is recognized. In a case of the HOID, it is possible to recognize a special relationship (there may be another case of a relationship indicating sitting, operating, etc.) that indicates an object that is held by a person, so that it is possible to use for a task (for example, a fraud detection task to be performed at the self-service checkout register) as meaningful information. After an object has been detected as Something, a checkout bag or the like is identified as a unique class represented by a Bag (checkout bag). The checkout bag is valuable information for the fraud detection task performed at the self-service checkout register, but is not valuable information for other tasks. Accordingly, it is worth to use on the basis of unique knowledge of the fraud detection task that is performed at the self-service checkout register in a course of a motion of taking out a commodity product from a basket (shopping basket) and putting the commodity product into the bag, and thus, a useful effect is obtained.

A description will be given here by referring back to FIG. 3. The machine learning model 104 is one example of a machine learning model that has been trained to identify a person and an object (for example, a person and storage (a checkout bag, etc.)) appearing in the training data. Specifically, the machine learning model 104 is a machine learning model that identifies, from the input image data, a person, a commodity product, and a relationship between the person and the commodity product, and then, outputs the identification result. For example, a model used for the HOID may be used for the machine learning model 104, and also, a machine learning model using various neural networks or the like may be used for the machine learning model 104. In a case of the HOID, the item of "the region information on a person and a class, the class of a commodity product (object) and the region information, and the interaction between the person and the commodity product" is output.

In addition, the machine learning model 104 is able to use a model that outputs a region of the hand, a region of a commodity product, and the skeleton information on the hand in accordance with an input of the image data.

The video image data DB 105 is a database that stores therein the video image data that has been captured by the camera 30 that is installed in the self-service checkout register 50. For example, the video image data DB 105 stores therein video image data obtained by each of the self-service checkout registers 50 or each of the cameras 30.

The fraud rule DB 106 is a database in which a motion of the hand or a motion of a commodity product that is determined to be a fraudulent behavior is defined. Specifically, the fraud rule DB 106 stores therein a fraudulent behavior pattern that is specified by a past history or the like.

FIG. 5 is a diagram illustrating an example of information stored in the fraud rule DB 106. As illustrated in FIG. 5, the fraud rule DB 106 stores therein items of "a fraud category, a target, and a fraud pattern" in an associated manner. The "fraud category" stored here is information that indicates the content of a fraud (an abnormal behavior). The "target" is information that is used to specify whether a determination target of a fraud is a motion of a hand or a motion of a commodity product. The "fraud pattern" is a change in a movement of the hand that is targeted for determination of a fraud or a change in a movement of a plurality of commodity products that are targeted for determination of a fraud.

In the example illustrated in FIG. 5, a fraud 1 is a fraud pattern that is targeted for a movement of a plurality of commodity products, and that is an abnormal behavior determined to be a fraud in the case where a motion of gripping two commodity products and piling up the two gripped commodity products, and then putting the two gripped commodity products into a bag (a carry-out bag) has been detected. That is, the fraud 1 corresponds to a fraud of a read error called as a label switch or the like.

A fraud 2 is a fraud pattern that is targeted for a movement of a plurality of commodity products, and that is an abnormal behavior determined to be a fraud in the case where a motion of taking out, after a plurality of small commodity products have been scanned multiple times, another commodity product from a shopping basket and putting the other commodity product into a bag has been detected. A fraud 3 is a fraud pattern that is targeted for a movement of a hand, and that is an abnormal behavior determined to be a fraud in the case where a motion of holding small commodity products in both hands has been detected. That is, the fraud 3 corresponds to a fraud of a read error called as a label switch or the like.

A fraud 4 is a fraud pattern that is targeted for a movement of a hand, and that is an abnormal behavior determined to be a fraud in the case where a motion of gripping a commodity product in each of the right hand and the left hand, scanning only one of the commodity products, and putting both of the commodity products into a bag has been detected. A fraud 5 is a fraud pattern that is targeted for a movement of a hand and a movement of a plurality of commodity products, and that is an abnormal behavior determined to be a fraud in the case where a motion of gripping a plurality of commodity products, registering a single piece of commodity product at a checkout register screen, and then putting the plurality of commodity products into a bag has been detected. That is, the fraud 5 corresponds to a fraud called a banana trick or the like or a fraud of bar code hiding or the like.

A description will be given here by referring back to FIG. 3. The control unit 110 is a processing unit that manages the entirety of the information processing apparatus 100 and is implemented by, for example, a processor or the like. The control unit 110 includes a machine learning unit 111, a video image acquisition unit 112, a region specifying unit 113, a tracking unit 114, a fraud detection unit 115, and a warning control unit 116. In addition, the machine learning unit 111, the video image acquisition unit 112, the region specifying unit 113, the tracking unit 114, the fraud detection unit 115, and the warning control unit 116 are implemented by an electronic circuit that is included in a processor or implemented by a process or the like that is executed by the processor.

Machine Learning

The machine learning unit 111 is a processing unit that performs machine learning on the machine learning model 104 by using each of the pieces of training data that are stored in the training data DB 103. FIG. 6 is a diagram illustrating machine learning performed on the machine learning model 104. FIG. 6 illustrates an example in which the HOID is used for the machine learning model 104. As illustrated in FIG. 6, the machine learning unit 111 inputs the input data on the training data to the HOID, and acquires an output result of the HOID. In the output result, the class of the person, the class of the object, the interaction between the person and the object, and the like that are detected by the HOID are included. Then, the machine learning unit 111 calculates error information indicating an error between correct answer information on the training data and the output result of the HOID, and performs machine learning that updates the parameters of the HOID by using error back propagation such that the error is decreased.

In addition, the machine learning unit 111 is also able to generate a model that outputs, in accordance with an input of the image data, a region of a hand, a region of a commodity product, and skeleton information on the hand. FIG. 7 is a diagram illustrating machine learning performed on the machine learning model 104. As illustrated in FIG. 7, the machine learning unit 111 inputs, to the machine learning model 104, the training data in which "image data" is used as an explanatory variable and the items of "the region of the hand, the region of the commodity product, and the skeleton information on the hand" are used as objective variables (correct answer information), and then, calculates error information indicating an error between the output result of the items of "the region of the hand, the region of the commodity product, and skeleton information on the hand" and the objective variable of the items of "the region of the hand, the region of the commodity product, and the skeleton information on the hand" in the machine learning model 104. Then, the machine learning unit 111 performs machine learning that updates the parameters of the machine learning model 104 by using error back propagation such that the error is decreased.

Here, skeleton information is information illustrated in, for example, FIG. 8. FIG. 8 is a diagram illustrating an example of the skeleton information. It is possible to use, for the skeleton information, 18 pieces (number 0 to number 17) of definition information that are obtained by numbering each of joints specified by a known skeleton model. For example, a right shoulder joint (SHOULDER RIGHT) is indicated by number 7, a left elbow joint (ELBOW_LEFT) is indicated by number 5, a left knee joint (KNEE LEFT) is indicated by number 11, and a right hip joint (HIP RIGHT) is indicated by number 14. Therefore, it is possible to acquire 18 pieces of coordinate information on the skeleton illustrated in FIG. 8 from the image data, and, for example, "the X coordinates=X7, the Y coordinates=Y7, and the Z coordinates=Z7" are acquired as the position of the right shoulder joint indicated by number 7. Furthermore, for example, the Z-axis may be defined as a horizontal direction, and the Y-axis may be defined as a vertical direction.

Furthermore, as the machine learning model 104, it may be possible to use the machine learning model illustrated in FIG. 6 or the machine learning model illustrated in FIG. 7, or it may be possible to use both the machine learning models illustrated in FIG. 6 and FIG. 7.

Video Image Acquisition

The video image acquisition unit 112 is a processing unit that acquires video image data from the camera 30. For example, the video image acquisition unit 112 acquires video image data from the camera 30 installed in the self-service checkout register 50 at any time, and stores therein the video image data DB 105.

Specifying of Region

The region specifying unit 113 is a processing unit that specifies, from the video image data by inputting video image data to the machine learning model 104, a region of a hand of a person and a region of a commodity product that is being gripped in the hand of the person. For example, the region specifying unit 113 specifies, by using the HOID, the first region that includes the hand of the person, the second region that includes the commodity product, and the relationship between the first region and the second region, and specifies a behavior of the person exhibited with respect to the commodity product.

FIG. 9 is a diagram illustrating behavioral identification performed by using the HOID. As illustrated in FIG. 9, the region specifying unit 113 inputs each of the pieces of image data included in the video image data to the HOID, and acquires an output result obtained from the HOID. As described above, in the output result obtained from the HOID, the Bbox of the person, the Bbox of the object, a probability value of the interaction between the person and the object, a class name, and the like are included. Then, the region specifying unit 113 identifies one of the behaviors indicated by the following drawings (a), (b), and (c) on the basis of the output result obtained from the HOID.

For example, as indicated by the drawing (a) illustrated in FIG. 9, the region specifying unit 113 identifies (specifies) a person and a commodity product and identifies (specifies) that the person is gripping the commodity product from the output result obtained from the HOID. Furthermore, the position of the shopping basket may be assigned by an administrator or the like, or may be automatically assigned by using another machine learning model or the like. In addition, as indicated by the drawing (b) illustrated in FIG. 9, by identifying the person and the commodity product and identifying that the person is gripping the commodity product from the output result obtained from the HOID, the region specifying unit 113 also specifies a commodity product that is allowed to pass through the scan position of each of the codes, such as a bar code or two-dimensional code, at the self-service checkout register 50. In addition, as indicated by the drawing (c) illustrated in FIG. 9, by identifying the person and the commodity product, identifying that the person is gripping the commodity product, identifying a person and a checkout bag, and identifying that the person is gripping the checkout bag from the output result obtained from the HOID, the region specifying unit 113 also specifies the commodity product that has been put into the checkout bag by the user.

In addition, by inputting the video image data to the machine learning model 104, the region specifying unit 113 is also able to specify, from the video image data, the region of the hand of the person, the region of the commodity product that is being gripped in the hand of the person, and the skeleton information on the person. In addition, by associating each of the behaviors with a transition of the skeleton information obtained at the time of each of the behaviors, the region specifying unit 113 is also able to specify, from each of the regions and the skeleton information specified from the video image data, a behavior of the person exhibited with respect to the commodity product and a behavior of the person performed on the self-service checkout register 50 included in the video image data.

Tracking

The tracking unit 114 is a processing unit that tracks, in the case where the number of commodity products that are being gripped in a hand of a person is plural, either a movement of the hand of the person who is gripping the plurality of commodity products, or, a movement of the plurality of commodity products. Specifically, the tracking unit 114 performs tracking in the case where a person who is gripping a plurality of commodity products has been detected in a specific result obtained from the frame included in the video image data by the region specifying unit 113. In other words, the tracking unit 114 tracks a motion related to the same commodity products in continuous frames that are present subsequent to a certain frame, in which the plurality of commodity products have been identified, included in the video image data. Then, the tracking unit 114 stores the tracking result in the storage unit 102, and outputs the tracking result to the fraud detection unit 115.

In addition, in the case where the number of bounding boxes of the commodity products is plural in the output result obtained from the HOID, the tracking unit 114 determines whether or not the positions of the plurality of bounding boxes are overlapped, and, in the case where the positions of the bounding boxes are overlapped, the tracking unit 114 is also able to perform tracking.

Fraud Detection

The fraud detection unit 115 is a processing unit that detects an abnormality of a behavior of registering a commodity product to the self-service checkout register 50 on the basis of a change in a movement of a hand that has been tracked by the tracking unit 114 or a change in a movement of a plurality of commodity products that have been tracked by the tracking unit 114. Specifically, the fraud detection unit 115 detects a fraudulent behavior in the case where a pattern of a movement of a tracked hand or a pattern of a movement of a tracked commodity product corresponds to the pattern that is stored in the fraud rule DB 106.

For example, the fraud detection unit 115 detects a fraudulent behavior indicated by the fraud 1 in the case where "a motion of gripping two commodity products and piling up the two gripped commodity products, and then putting the two gripped commodity products into a bag (carry-out bag)" has been detected.

FIG. 10 is a diagram illustrating an example of a fraud detection in the case where two commodity products have been gripped. As illustrated in FIG. 10, the fraud detection unit 115 detects a fraud in the case where the fraud detection unit 115 has detected a motion of piling up the commodity products from a result of specifying a region obtained by the region specifying unit 113. For example, in the case where the fraud detection unit 115 has detected a motion of piling a high-priced commodity product A on top of a low-priced commodity product B, the fraud detection unit 115 detects a fraud (for example, a label switch) conducted by scanning a bar code of the low-priced commodity product instead of a bar code of the high-priced commodity product.

In addition, even when a pattern is other than the patterns that are stored in the fraud rule DB 106, the fraud detection unit 115 is also able to detect a fraudulent behavior in the case where the fraud detection unit 115 has detected a motion that has been defined as a fraudulent behavior and that indicates that "a movement of a hand is a motion of piling up a plurality of commodity products". Similarly, the fraud detection unit 115 is also able to detect a fraudulent behavior in the case where the fraud detection unit 115 has detected a motion that has been defined as a fraudulent behavior in advance and that indicates that "a motion of piling up the commodity products" or "a motion of piling up the bar codes".

FIG. 11 is a diagram illustrating an example of fraud detection performed on the basis of the fraudulent behavior that has been defined in advance. As illustrated in FIG. 11, the fraud detection unit 115 detects a fraud in the case where, after a motion of gripping a commodity product has been detected from the result of specifying a region obtained by the region specifying unit 113, the fraud detection unit 115 detects from the self-service checkout register 50 that the commodity product has been registered without a scan motion being detected. For example, the fraud detection unit 115 detects a fraud (for example, a banana trick) in the case where, after a high-priced commodity product (for example, a melon) to which a bar code is not assigned has been gripped, a low-priced commodity product (for example, a banana) that is the same kind of commodity product, though, has been registered at a registration screen of the self-service checkout register 50.

For example, the fraud detection unit 115 detects a fraudulent behavior indicated by the fraud 4 by determining the behavior corresponds to the fraud 4 included in the fraud rule illustrated in FIG. 5 in the case where "a motion of gripping a wine in the left hand, gripping a wine in the right hand, and then, scanning only the wine gripped in the right hand" has been detected as the pattern of a movement of the hand.

For example, the fraud detection unit 115 specifies, from the output result obtained from the HOID, the positional relationship with the area that is set in order to scan a commodity product to the self-service checkout register 50. Then, the fraud detection unit 115 detects a fraudulent behavior when it is determined, from the output result obtained from the HOID, that a bar code of each of the two commodity products has not been scanned to the self-service checkout register 50. In other words, the fraud detection unit 115 detects a fraudulent behavior in the case where both of the tow commodity products do not pass through the scan region that is set to each of the cameras.

FIG. 12 is a diagram illustrating an example of fraud detection on the basis of the positional relationship. As illustrated in FIG. 12, the fraud detection unit 115 detects a fraud in the case where a motion of holding commodity products in both hands, and a motion of scanning a commodity product at a position that is different from a supposed bar code position have been detected from a result of specifying a region obtained by the region specifying unit 113. For example, the fraud detection unit 115 detects a fraud conducted by scanning the bar code of a single piece of can that is included in a package of six cans instead of scanning a bar code of a 6-can packaged commodity product containing six cans each of which a bar code is assigned.

In addition, the fraud detection unit 115 is able to detect a further complicated motion by using the skeleton information that is specified by the machine learning model 104, so that the fraud detection unit 115 is also able to improve the accuracy of the determination of the fraudulent behavior described above. For example, the fraud detection unit 115 specifies, from the skeleton information, a pose of a user, a movement of a finger, a movement of a joint, and the like, and detects a fraudulent behavior by comparing these pattern with the pattern that is prepared in advance.

Alert Report

The warning control unit 116 is a processing unit that generates an alert and that performs report control of the alert in the case where a fraudulent behavior (fraudulent motion) has been detected by the fraud detection unit 115. For example, the warning control unit 116 generates an alert indicating that the commodity product that has not been registered to the self-service checkout register 50 by a person, or, an alert indicating that the commodity product that has been registered to the self-service checkout register 50 by a person is abnormal, and outputs the generated alert to the self-service checkout register 50 and the administrator terminal 60.

In addition, if the warning control unit 116 generates an alert related to an abnormality of a behavior of registering a commodity product to the self-service checkout register 50, the warning control unit 116 outputs, from the self-service checkout register 50, a voice or a screen that makes the person located at the self-service checkout register 50 aware of a registration omission of the commodity product.

FIG. 13 is a diagram illustrating a report example of the alert. As illustrated in FIG. 13, the warning control unit 116 causes the message indicating that "Is there any commodity product for a scan omission? Please scan the commodity products again.", or the like to be displayed on a display screen, such as a touch panel, of the self-service checkout register 50.

In addition, the warning control unit 116 causes a warning lamp installed in the self-service checkout register 50 to be turned on, causes an identifier of the self-service checkout register 50 and a message indicating that a fraud possibly occurs to be displayed on the administrator terminal 60, and causes the identifier of the self-service checkout register 50 and a message indicating an occurrence of the fraud and indicating a need to check to be transmitted to the terminal that is used by a store clerk who is present in an inside of a store.

In addition, in the case where the warning control unit 116 generates an alert related to an abnormality of a behavior of registering a commodity product to the self-service checkout register 50, the warning control unit 116 causes the camera 30 included in the self-service checkout register 50 to capture an image of a person, and to store the image data on the captured person and the alert in an associated manner in the storage unit. By doing so, it is possible to collect information on a fraudulent person who exhibits a fraudulent behavior, so that it is possible to make use of various measures to prevent the fraudulent behavior by detecting, at the entrance of the store, a customer who visits the store and who has a history of exhibiting a fraudulent behavior or the like. In addition, the warning control unit 116 is able to detect a fraudulent person from the image data on the person who uses the self-service checkout register 50, detect a fraudulent person at the entrance of the store, and the like by performing supervised learning using the image data on the fraudulent person and by generating the machine learning models. In addition, the warning control unit 116 is also able to acquire and store information on a credit card that is used by a person who has exhibited a fraudulent behavior from the self-service checkout register 50.

Specific Example

In the following, a specific example of the process described above performed by the information processing apparatus 100 will be described. FIG. 14 is a diagram illustrating a series of processes up to an alarm report after tracking and fraud detection. As illustrated in FIG. 14, in the video image data, each of the pieces of image data to which an identifier has been assigned is included. FIG. 14 illustrates an example in which a region and a relationship are specified by using the HOID.

First, for image data 1, when the information processing apparatus 100 specifies items of "a shopping basket, a person, and a mutual relationship (grip) between the person and the shopping basket" by using the region specifying unit 113, a plurality of commodity products are not detected, so that the information processing apparatus 100 determines that this case is not a fraudulent behavior without performing tracking.

Subsequently, for image data 2, when the information processing apparatus 100 specifies items of "a single commodity product, the person, and a mutual relationship (grip) between the person and the commodity product" by using the region specifying unit 113, a plurality of commodity products are not detected, so that the information processing apparatus 100 determines that this case is not a fraudulent behavior without performing tracking.

Subsequently, for image data 3, when the information processing apparatus 100 specifies items of "the commodity product, the person, and a mutual relationship (grip, and scan) between the person and the commodity product at the scan position" by using the region specifying unit 113, a plurality of commodity products are not detected, so that the information processing apparatus 100 determines that this case is not a fraudulent behavior without performing tracking.

Subsequently, for image data 4, when the information processing apparatus 100 specifies items of "the commodity product, the person, and a mutual relationship (grip) between the person and the commodity product in the checkout bag" by using the region specifying unit 113, a plurality of commodity products are not detected, so that the information processing apparatus 100 determines that this case is not a fraudulent behavior without performing tracking.

Subsequently, for image data 5, when the information processing apparatus 100 specifies items of "two commodity products, and a mutual relationship (grip) between the person and the commodity products" by using the region specifying unit 113, a plurality of commodity products have been detected, so that the information processing apparatus 100 starts tracking performed by the tracking unit 114. Furthermore, the information processing apparatus 100 performs fraud detection, by using the fraud detection unit 115, on the basis of the change in the movement of the hand obtained after the start of the tracking or the change in the movement of the plurality of commodity products obtained after the start of the tracking.

Subsequently, tracking is performed on image data 6. In other words, in a period of time for which two commodity products are detected by the region specifying unit 113, the information processing apparatus 100 performs fraud detection, by using the fraud detection unit 115, on the basis of the change in the movement of the hand obtained after the start of the tracking or the change in the movement of the plurality of commodity products obtained after the start of the tracking.

Similarly, tracking is performed on image data 7. Here, the information processing apparatus 100 detects a fraudulent behavior in the case where a motion corresponding to the fraud rule has been detected by the fraud detection unit

115 on the basis of the change in the movement of the hand obtained after the start of the tracking or the change in the movement of the plurality of commodity products obtained after the start of the tracking. Then, the information processing apparatus 100 generates an alert and send a report. At this time, the information processing apparatus 100 may ends the tracking, may stop the tracking until the end of a reaction with respect to the alert performed by a store clerk or the like, or may continue the tracking.

Flow of Process

FIG. 15 is a flowchart illustrating the flow of the process. As illustrated in FIG. 15, the information processing apparatus 100 acquires the video image data at any time (Step S101).

Subsequently, if the information processing apparatus 100 receives an instruction to start the process of fraud detection (Yes at Step S102), the information processing apparatus 100 acquires a frame included in the video image data (Step S103). Here, if the video image data is not present, the information processing apparatus 100 ends the process. In contrast, if the video image data is present, the information processing apparatus 100 specifies a region of the hand and a region of the commodity product by using the machine learning model 104 (Step S104).

Then, if a plurality of commodity products are not detected (No at Step S105), the information processing apparatus 100 repeats the process at Step S103 and the subsequent processes. In contrast, a plurality of commodity products have been detected (Yes at Step S105), the information processing apparatus 100 determines whether or not tracking is being performed (Step S106).

Here, if tracking is not being performed (No at Step S106), the information processing apparatus 100 starts the tracking (Step S107), and performs the process at Step S108. In contrast, if tracking is being performed (Yes at Step S106), the information processing apparatus 100 performs the process at Step S108.

In other words, in the case where the motion corresponding to the fraud rule is not detected (No at Step S108), the information processing apparatus 100 repeats the process at Step S103 and the subsequent processes, whereas, if the motion corresponding to the fraud rule has been detected (Yes at Step S108), the information processing apparatus 100 sends an alert report (Step S109), and ends the process.

Effects

As described above, if a number of commodity products that is being gripped in a hand of a person is plural, the information processing apparatus 100 tracks either a movement of the hand of the person who is gripping the plurality of commodity products, or a movement of the plurality of commodity products. Then, the information processing apparatus 100 generates, on the basis of a change in the tracked movement of the hand or a change in the tracked movement of the plurality of commodity products, an alert connected to an abnormality of a behavior of registering the commodity products to the self-service checkout register 50. Therefore, the information processing apparatus 100 is able to detect a fraud conducted at the self-service checkout register 50 without using a weight sensor or the like.

In addition, in the case where the movement of the commodity product has been tracked and in the case where the changes in the movements of the plurality of commodity products included in the region of the commodity products overlap, that is, correspond to a pattern that has been assigned in advance, the information processing apparatus

100 generates the alert connected to the abnormality of the behavior of the commodity products to the self-service checkout register 50. Therefore, the information processing apparatus 100 is able to detect an inevitable error, such as a scan omission, or an intentional fraud.

In addition, in the case where the movement of the hand has been tracked and in the case where the movement of the hand corresponds to the motion of piling up the plurality of commodity products, the information processing apparatus 100 generates the alert connected to the abnormality of the behavior of registering the commodity product to the self-service checkout register 50. Therefore, the information processing apparatus 100 is able to detect a fraud conducted by scanning a bar code of a low-priced commodity product instead of a high-priced commodity product.

In addition, the information processing apparatus 100 acquires, by using the machine learning model 104, a bounding box that indicates the region of the hand, a bounding box of the commodity product that indicates the region of the commodity products, and the skeleton information on the hand of the person. As a result, the information processing apparatus 100 is able to specify a motion of the person and a movement of the commodity product in a short time as compared to image analysis, so that it is possible to implement real-time fraud detection.

In addition, the information processing apparatus 100 specifies, by using the machine learning model 104, the first region that includes the hand of the person, the second region that includes the commodity product, and the relationship between the first region and the second region. Then, on the basis of the first motion of the person gripping the first commodity product in the right hand and the second motion of the person gripping the second commodity product in the left hand, the information processing apparatus 100 detects that a code of one of the commodity products between the first commodity product and the second commodity product has not been scanned by the self-service checkout register 50. Therefore, the information processing apparatus 100 is able to detect a scan omission occurring when only one commodity product is scanned or detect an intentional fraud.

In addition, the information processing apparatus 100 generates an alert indicating that there is a commodity product that has not been registered to the self-service checkout register 50 by a person, or, indicating that the commodity product that has been registered to the self-service checkout register 50 by a person is abnormal. Therefore, a store clerk or the like is able to react by listening the circumstances by using the information processing apparatus 100 before the person who has exhibited the fraudulent behavior leaves the store.

In addition, in the case where an alert related to an abnormality of a behavior of registering the commodity product to the self-service checkout register 50 has been generated, the information processing apparatus 100 outputs, from the self-service checkout register 50, a voice or a screen that makes the person located at the self-service checkout register 50 aware of a registration omission of the commodity product. Therefore, the information processing apparatus 100 is able to directly alert the person who is performing a scan even in a case of an inevitable mistake or even in a case of an intentional fraud, so that it is possible to reduce the mistake or the intentional fraud.

In addition, when an alert related to an abnormality of a behavior of registering the commodity product to the self-service checkout register 50 is generated, the information processing apparatus 100 causes the camera included in the self-service checkout register 50 to capture an image of the person, and stores the image data on the captured person and the alert in an associated manner in the storage unit. Accordingly, the information processing apparatus 100 is able to collect and hold the information on the fraudulent person who exhibits the fraudulent behavior, so that it is possible to make use of various measures to prevent the fraudulent behavior by detecting a visit of the fraudulent person to the store from the captured data obtained by the camera that captures a customer who visits the store. In addition, the information processing apparatus 100 is also able to acquire and store information on a credit card that is used by a person who has exhibited a fraudulent behavior from the self-service checkout register 50, so that it is possible to charge a fee via a credit card company in the case where the fraudulent behavior has been confirmed.

(b) Second Embodiment

In the above explanation, a description has been given of the embodiments according to the present invention; however, the present invention may also be implemented with various kinds of embodiments other than the embodiments described above.

Numerical Value, Etc.

The number of self-service checkout registers and cameras, examples of numerical values, examples of the training data, the number of pieces of training data, the machine the learning models, each of the class names, the number of classes, the data formats, and the like that are used in the embodiment described above are only examples and may be arbitrarily changed. Furthermore, the flow of the processes descried in each of the flowcharts may be changed as long as the processes do not conflict with each other. In addition, a model generated from various algorithms, such as a neural network, may be used for each of the models.

In addition, regarding a scan position and a position of a shopping basket, the information processing apparatus 100 is also able to use a known technology, such as another machine learning model for detecting a position, an object detection technology, or a position detection technology. For example, the information processing apparatus 100 is able to detect a position of a shopping basket on the basis of a difference between frames (image data) and a change in frames in time series, so that the information processing apparatus 100 may also perform detection by using the difference between frames and the change in frames in time series, or may also generate another model by using the difference between frames and the change in frames in time series. Furthermore, by designating a size of the shopping basket in advance, the information processing apparatus 100 is also able to identify the position of the shopping basket in the case where an object with that size has been detected from the image data. In addition, the scan position is a position that is fixed to an extent, so that the information processing apparatus 100 is also able to identify the position designated by an administrator or the like as the scan position.

Motion of Fingers

The information processing apparatus 100 described above is able to acquire the skeleton information, so that the information processing apparatus 100 is able to acquire a motion of a finger instead of a motion of a hand. For example, the information processing apparatus 100 tracks a movement of the fingers of the person who is gripping a plurality of commodity products, and specifies, when a pattern of the tracked movement of the fingers of the person matches the rule that has been set in advance, a position at which the pattern of the movement of the fingers that has been set in advance has been exhibited. Then, if the specified position of the fingers is within a range of an area that has been set in order to scan a commodity product to the self-service checkout register 50, the information processing apparatus 100 generates the alert related to the abnormality of the behavior of registering the commodity product to the self-service checkout register 50.

For example, the information processing apparatus 100 is able to detect a fraudulent behavior by detecting a motion of piling up a plurality of small commodity products by using the fingers in front of the scan position. This type of motion is linked to a fraudulent behavior, such as a behavior conducted by scanning only one of the commodity products from among a plurality of commodity products, and then putting the plurality of commodity products into a bag; however, the information processing apparatus 100 is able to detect this behavior as a fraudulent behavior.

System

The flow of the processes, the control procedures, the specific names, and the information containing various kinds of data or parameters indicated in the above specification and drawings can be arbitrarily changed unless otherwise stated. Furthermore, specific examples, distributions, numerical values, and the like described in the embodiment are only examples and can be arbitrarily changed.

Furthermore, the specific shape of a separate or integrated device is not limited to the drawings. For example, the tracking unit 114 and the fraud detection unit 115 may be integrated. In other words, all or part of the device can be configured by functionally or physically separating or integrating any of the units in accordance with various loads or use conditions. In addition, all or any part of each of the processing functions performed by the each of the devices can be implemented by a CPU and by programs analyzed and executed by the CPU or implemented as hardware by wired logic.

Furthermore, all or any part of each of the processing functions performed by each of the devices can be implemented by a CPU and by programs analyzed and executed by the CPU or implemented as hardware by wired logic.

Hardware

FIG. 16 is a diagram illustrating an example of a hardware configuration. Here, as one example, the information processing apparatus 100 will be described. As illustrated in FIG. 16, the information processing apparatus 100 includes a communication device 100a, a hard disk drive (HDD) 100b, a memory 100c, and a processor 100d. In addition, each of the units illustrated in FIG. 16 is connected each other via a bus or the like.

The communication device 100a is a network interface card or the like, and communicates with another device. The HDD 100b stores therein programs and the DB that operate the function illustrated in FIG. 3.

The processor 100d operates the process that executes each of the functions described above in FIG. 3 or the like by reading the programs that execute the same process as that performed by each of the processing units illustrated in FIG. 3 from the HDD 100b or the like and loading the read program in the memory 100c. For example, the process executes the same function as that performed by each of the processing units included in the information processing apparatus 100. Specifically, the processor 100d reads, from the HDD 100b or the like, the programs having the same function as that performed by each of the machine learning unit 111, the video image acquisition unit 112, the region specifying unit 113, the tracking unit 114, the fraud detection unit 115, the warning control unit 116, and the like. Then, the processor 100d executes the process for executing the same process as that performed by each of the machine learning unit 111, the video image acquisition unit 112, the region specifying unit 113, the tracking unit 114, the fraud detection unit 115, the warning control unit 116, and the like.

In this way, the information processing apparatus 100 is operated as an information processing apparatus that executes an information processing method by reading and executing the programs. In addition, the information processing apparatus 100 is also able to implement the same function as that described above in the embodiment by reading the programs described above from a recording medium by a medium recording device and executing the read programs described above. In addition, the programs described in another embodiment are not limited to be executed by the information processing apparatus 100. For example, the embodiment described above may also be similarly used in a case in which another computer or a server executes a program, or in a case in which another computer and a server cooperatively execute the program with each other.

The programs may be distributed via a network, such as the Internet. Furthermore, the programs may be executed by storing the programs in a recording medium that can be read by a computer readable medium, such as a hard disk, a flexible disk (FD), a CD-ROM, a magneto-optical disk (MO), a digital versatile disk (DVD), or the like, and read the programs from the recording medium by the computer.

FIG. 17 is a diagram illustrating an example of a hardware configuration of the self-service checkout register 50. As illustrated in FIG. 17, the self-service checkout register 50 includes a communication interface 400a, a HDD 400b, a memory 400c, a processor 400d, an input device 400e, and an output device 400f. In addition, each of the units illustrated in FIG. 17 is connected each other via a bus or the like.

The communication interface 400a is a network interface card or the like, and communicates with another device. The HDD 400b stores therein programs and data that operate each of the functions of the self-service checkout register 50.

The processor 400d is a hardware circuit that operates the process that executes each of the functions of the self-service checkout register 50 by reading the program that executes the process of each of the functions of the self-service checkout register 50 from the HDD 400b or the like and loading the read program in the memory 400c. In other words, the process executes the same function as that performed by each of the processing units included in the self-service checkout register 50.

In this way, by reading and executing the program for executing the process of each of the functions of the self-service checkout register 50, the self-service checkout register 50 is operated as an information processing apparatus that performs an operation control process. Furthermore, the self-service checkout register 50 is also able to implement each of the functions of the self-service checkout register 50 by reading the programs from a recording medium by a medium reading device and executing the read programs. In addition, the programs described in another embodiment are not limited to be executed by the self-service checkout register 50. For example, the present embodiment may also be similarly used in a case in which another computer or a server execute a program, or in a case in which another computer and a server cooperatively execute a program with each other.

Furthermore, the programs that execute the process of each of the functions of the self-service checkout register 50 can be distributed via a network, such as the Internet. Furthermore, these programs can be executed by recording the programs in a recording medium that can be read by a computer readable medium, such as a hard disk, a flexible disk (FD), a CD-ROM, a magneto-optical disk (MO), a digital versatile disk (DVD), or the like, and read the programs from the recording medium by the computer.

The input device 400*e* detects various input operations performed by a user, such as an input operation performed with respect to the programs executed by the processor 400*d*. Examples of the input operation include a touch operation or the like. In a case of the touch operation, the self-service checkout register 50 further includes a display unit, and the input operation detected by the input device 400*e* may be a touch operation performed on the display unit. The input device 400*e* may be, for example, a button, a touch panel, a proximity sensor, or the like. In addition, the input device 400*e* reads a bar code. The input device 400*e* is, for example, a bar code reader. The bar code reader includes a light source and an optical sensor and scans the bar code.

The output device 400*f* outputs data that is output from the program executed by the processor 400*d* via external device, such as an external display device, that is connected to the self-service checkout register 50. In addition, in the case where the self-service checkout register 50 includes a display unit, the self-service checkout register 50 need not include the output device 400*f*.

According to an aspect of an embodiment, it is possible to detect an error made or a fraud conducted at an accounting machine by a user.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an information processing program that causes a computer to execute a process comprising:

acquiring video image data on a person who is scanning a code of a commodity product to an accounting machine;

specifying, from the acquired video image data by analyzing the acquired video image data, a first region that includes a hand of the person and a second region that includes the commodity product that is being gripped in the hand of the person;

tracking either a movement of the hand of the person that is gripping the commodity product, or a movement of the gripped commodity product; and generating, based on a change in the tracked movement of the hand or a change in the tracked movement of the commodity product, an alert connected to an abnormality of a behavior of registering the commodity product to the accounting machine, wherein the specifying includes specifying, from the acquired video image data by inputting the acquired video image data to a machine learning model, the first region and the second region, the tracking includes tracking, when a number of commodity products that are being gripped in the hand of the person is plural, either the movement of the hand of the person that is gripping the plurality of commodity products, or, the movement of the plurality of commodity products, the generating the alert includes generating, based on the change in the tracked movement of the hand or a change in the tracked movement of the plurality of commodity products, the alert connected to an abnormality of a behavior of registering the commodity products to the accounting machine, the machine learning model outputs, in accordance with an input of the video image data, a bounding box that indicates the first region, a bounding box of the commodity product that indicates the second region, and skeleton information on the hand of the person, the specifying includes generating, by inputting the acquired video image data to the machine learning model, the bounding box that indicates the first region of the hand, the bounding box of the commodity product that indicates the second region of the commodity product, and the skeleton information on the hand, the tracking includes determining, when a number of the generated bounding boxes of the commodity product is plural, whether or not positions of the plurality of bounding boxes are overlapped, and the generating includes identifying, when it is determined that the overlapped positions are present, a pattern of the movement of the hand of the person based on the skeleton information on the hand of the person, and generating, by comparing the identified pattern of the movement of the hand with a rule that is set in advance, the alert related to the abnormality of the behavior of registering the commodity products to the accounting machine.

2. The non-transitory computer-readable recording medium according to claim 1, wherein the generating includes determining, when the movement of the commodity products has been tracked, whether or not a change in the movement of the plurality of commodity products included in the second region of the commodity product corresponds to a pattern that is assigned in advance, and generating, when the change in the movement of the plurality of commodity products corresponds to the pattern, the alert connected to the abnormality of the behavior of registering the commodity products to the accounting machine.

3. The non-transitory computer-readable recording medium according to claim 1, wherein the generating includes generating, when the movement of the hand has been tracked, and in a case where the movement of the hand corresponds to a motion of piling up the plurality of commodity products, the alert connected to the abnormality of the behavior of registering the commodity products to the accounting machine.

4. The non-transitory computer-readable recording medium according to claim 1, wherein the machine learning model specifies, in accordance with an input of the video image data, the first region, the second region, and a relationship between the first region and the second region, the specifying includes specifying, based on the first region, the second region, and the relationship that have been specified by inputting the acquired video image data to the machine learning model, a first motion of gripping a first commodity product in a right hand of the person and a second motion of gripping a second commodity product in a left hand, the tracking includes tracking the first motion and the second motion, and the generating includes detecting, based on the tracked first motion and the tracked second motion, that the code of the commodity product of either the first commodity product or the second commodity product has not been scanned to the accounting machine.

5. The non-transitory computer-readable recording medium according to claim 4, wherein, when it is determined that the code of the commodity product of each of the first commodity product and the second commodity product has not been scanned to the accounting machine based on a positional relationship between a set of the tracked first motion and the tracked second motion and an area that is set in order to scan the commodity products to the accounting machine, the generating the alert includes generating the alert indicating the abnormality of the behavior of registering the commodity products to the accounting machine.

6. The non-transitory computer-readable recording medium according to claim 1, wherein the generating includes generating, as the alert connected to the abnormality of the behavior of registering the commodity product to the accounting machine, an alert indicating that there is a commodity product that has not yet been registered to the accounting machine by the person, or, indicating that the commodity product that has been registered to the accounting machine by the person is abnormal.

7. The non-transitory computer-readable recording medium according to claim 1, wherein the process further includes notifying, when the alert connected to the abnormality of the behavior of registering the commodity product to the accounting machine is generated, a terminal used by a store clerk of identification information on the accounting machine and the generated alert in an associated manner.

8. The non-transitory computer-readable recording medium according to claim 1, wherein the generating includes outputting, in a case where the alert connected to the abnormality of the behavior of registering the commodity product to the accounting machine has been generated, voice or a screen that makes the person located at the accounting machine aware of a registration omission of the commodity product from the accounting machine.

9. The non-transitory computer-readable recording medium according to claim 1, wherein the process further includes:

capturing, when the alert connected to the abnormality of the behavior of registering the commodity product to the accounting machine has been generated, the person by a camera included in the accounting machine; and storing image data on the captured person and the alert in an associated manner in a storage.

10. The non-transitory computer-readable recording medium according to claim 1, wherein the accounting machine is a self-service checkout terminal, the specifying includes specifying, based on the acquired video image data, the first region from the acquired video image data, the tracking includes tracking, when a number of commodity products that are being gripped in the hand of the person is plural, the movement of the hand of the person that is gripping the plurality of commodity products, and the generating includes generating, based on the change in the tracked movement of the hand, the alert connected to the abnormality of the behavior of registering the commodity products to the self-service checkout terminal.

11. An information processing method comprising:

acquiring video image data on a person who is scanning a code of a commodity product to an accounting machine;

specifying, from the acquired video image data by analyzing the acquired video image data, a first region that includes a hand of the person and a second region that includes the commodity product that is being gripped in the hand of the person;

tracking either a movement of the hand of the person that is gripping the commodity product, or, a movement of the gripped commodity product; and generating, based on a change in the tracked movement of the hand or a change in the tracked movement of the commodity product, an alert connected to an abnormality of a behavior of registering the commodity product to the accounting machine, using a processor, wherein the specifying includes specifying, from the acquired video image data by inputting the acquired video image data to a machine learning model, the first region and the second region, the tracking includes tracking, when a number of commodity products that are being gripped in the hand of the person is plural, either the movement of the hand of the person that is gripping the plurality of commodity products, or, the movement of the plurality of commodity products, the generating the alert includes generating, based on the change in the tracked movement of the hand or a change in the tracked movement of the plurality of commodity products, the alert connected to an abnormality of a behavior of registering the commodity products to the accounting machine, the machine learning model outputs, in accordance with an input of the video image data, a bounding box that indicates the first region, a bounding box of the commodity product that indicates the second region, and skeleton information on the hand of the person, the specifying includes generating, by inputting the acquired video image data to the machine learning model, the bounding box that indicates the first region of the hand, the bounding box of the commodity product that indicates the second region of the commodity product, and the skeleton information on the hand, the tracking includes determining, when a number of the generated bounding boxes of the commodity product is plural, whether or not positions of the plurality of bounding boxes are overlapped, and the generating includes
identifying, when it is determined that the overlapped positions are present, a pattern of the movement of the hand of the person based on the skeleton information on the hand of the person, and generating, by comparing the identified pattern of the movement of the hand with a rule that is set in advance, the alert related to the abnormality of the behavior of registering the commodity products to the accounting machine.

12. An information processing apparatus comprising:

a memory; and a processor coupled to the memory and configured to:

acquire video image data on a person who is scanning a code of a commodity product to an accounting machine;

specify, from the acquired video image data by analyzing the acquired video image data, a first region that includes a hand of the person and a second region that includes the commodity product that is being gripped in the hand of the person;

track either a movement of the hand of the person that is gripping the commodity product, or, a movement of the gripped commodity product; and generate, based on a change in the tracked movement of the hand or a change in the tracked movement of the commodity product, an alert connected to an abnormality of a behavior of registering the commodity product to the accounting machine, wherein the processor further configures to:

specify, from the acquired video image data by inputting the acquired video image data to a machine learning model, the first region and the second region, track, when a number of commodity products that are being gripped in the hand of the person is plural, either the movement of the hand of the person that is gripping the plurality of commodity products, or, the movement of the plurality of commodity products, generate, based on the change in the tracked movement of the hand or a change in the tracked movement of the plurality of commodity products, the alert connected to an abnormality of a behavior of registering the commodity products to the accounting machine, wherein the machine learning model outputs, in accordance with an input of the video image data, a bounding box that indicates the first region, a bounding box of the commodity product that indicates the second region, and skeleton information on the hand of the person, wherein the processor further configures to:

generate, by inputting the acquired video image data to the machine learning model, the bounding box that indicates the first region of the hand, the bounding box of the commodity product that indicates the second region of the commodity product, and the skeleton information on the hand, determine, when a number of the generated bounding boxes of the commodity product is plural, whether or not positions of the plurality of bounding boxes are overlapped, identify, when it is determined that the overlapped positions are present, a pattern of the movement of the hand of the person based on the skeleton information on the hand of the person, and generate, by comparing the identified pattern of the movement of the hand with a rule that is set in advance, the alert related to the abnormality of the behavior of registering the commodity products to the accounting machine.

* * * * *